(12) United States Patent
Suzuki

(10) Patent No.: US 8,462,223 B2
(45) Date of Patent: Jun. 11, 2013

(54) IMAGE PICKUP APPARATUS, CONTROL METHOD FOR THE SAME, AND PROGRAM THEREOF

(75) Inventor: Asuka Suzuki, Osaka (JP)

(73) Assignee: Sony Corporation (JP)

( * ) Notice: Subject to any disclaimer, the term of this patent is extended or adjusted under 35 U.S.C. 154(b) by 452 days.

(21) Appl. No.: 12/660,620

(22) Filed: Mar. 2, 2010

(65) Prior Publication Data

US 2010/0231741 A1 Sep. 16, 2010

(30) Foreign Application Priority Data

Mar. 11, 2009 (JP) ................................ P2009-057529

(51) Int. Cl.
*H04N 5/228* (2006.01)
*H04N 5/232* (2006.01)
*G06K 9/00* (2006.01)

(52) U.S. Cl.
USPC .......................... 348/222.1; 348/345; 382/103

(58) Field of Classification Search
USPC ... 348/94–95, 222.1, 345, 347, 352; 382/118, 382/103
See application file for complete search history.

(56) References Cited

U.S. PATENT DOCUMENTS

| | | | |
|---|---|---|---|
| 8,224,117 B2 * | 7/2012 | Yamazaki et al. | 382/276 |
| 2007/0196097 A1 * | 8/2007 | Sugimoto | 396/234 |
| 2008/0187187 A1 | 8/2008 | Tezuka | |
| 2008/0239104 A1 * | 10/2008 | Koh | 348/240.99 |
| 2008/0273097 A1 * | 11/2008 | Nagashima | 348/231.99 |
| 2009/0147107 A1 * | 6/2009 | Kawahara et al. | 348/240.2 |
| 2009/0322897 A1 * | 12/2009 | Park | 348/222.1 |

FOREIGN PATENT DOCUMENTS

JP 2008-219874 A 9/2008

* cited by examiner

*Primary Examiner* — Trung Diep
(74) *Attorney, Agent, or Firm* — Lerner, David, Littenberg, Krumholz & Mentlik, LLP

(57) ABSTRACT

An image pickup apparatus including an image pickup device configured to obtain a captured image corresponding to an object image, an object detecting unit configured to detect a specific object in the captured image, an position obtaining unit configured to obtain a position at which the specific object exists in the captured image, a composition specifying unit configured to specify a recommended composition on the basis of the existence position of the specific object when the specific object is viewed as a main object, and an instruction control unit configured to instruct the execution of a predetermined operation which notifies a user of the recommended composition.

13 Claims, 19 Drawing Sheets

1A, 1B, 1C, 1D, 1E, 1F 1A, 1B, 1C, 1D, 1E, 1F 1A, 1B

IMAGE PICKUP APPARATUS, CONTROL METHOD FOR THE SAME, AND PROGRAM THEREOF

CROSS-REFERENCE TO RELATED APPLICATION

The present application claims priority from Japanese Patent Application No. JP 2009-057529 filed in the Japanese Patent Office on Mar. 11, 2009, the entire content of which is incorporated herein by reference.

BACKGROUND OF THE INVENTION

1. Field of the Invention

The present invention relates to a technique that improves the composition of a captured image.

2. Description of the Related Art

Recently, regarding image pickup apparatuses, there has been proposed a method in which a specific object in the captured image is detected before an image-capturing operation for capturing an image to be stored is performed and, by using the detected specific object, the image-capturing operation for capturing the image to be stored is performed.

For example, in patent document 1 (see Japanese Unexamined Patent Application Publication No. 2008-219874), a method is described. In the method, a person's face (a facial area) in the captured image is detected as the specific object before the image-capturing operation for capturing an image to be stored is performed. In addition, when there are a plurality of detected persons' faces, a person's face which a user views as a specific object is selected from among the plurality of detected persons' faces on the basis of the positions at which the persons' faces exist in the image capturing area.

SUMMARY OF THE INVENTION

However, according to the method described in patent document 1, while the image-capturing operation is performed by using image-capturing information obtained from the selected main object, it is difficult to obtain a captured image with a good composition while taking the position at which the specific object exists in the image capturing area into account.

Therefore, it is desirable to provide a technique capable of obtaining a captured image with a good composition.

According to an embodiment of the present invention, there is provided an image pickup apparatus including:
- an image pickup device configured to capture an image corresponding to an object image;
- object detecting means for detecting a specific object in the captured image;
- position obtaining means for obtaining a position at which the specific object exists in the captured image;
- composition specifying means for specifying, on the basis of the existence position of the specific object, a recommended composition which is recommended when the specific object is viewed as a main object; and
- instruction control means for instructing the execution of a predetermined operation which notifies a user of the recommended composition.

DESCRIPTION OF THE PREFERRED EMBODIMENTS

Hereinafter, preferred embodiments of the present invention will be described with reference to figures.

1. First Embodiment

[1-1. Structure]

Figure 1:
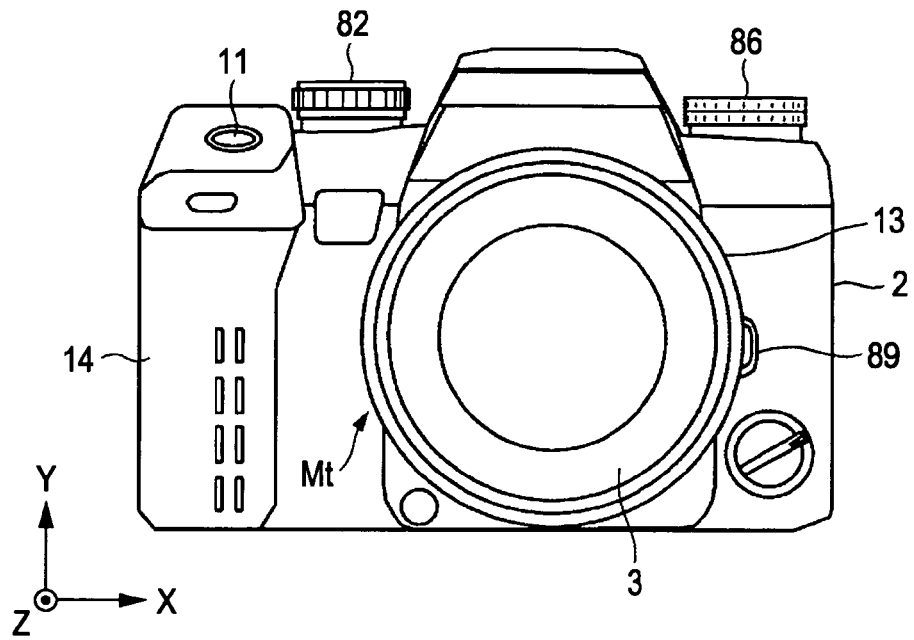
FIG. 1 is a diagram illustrating an external structure of an image pickup apparatus according to a first embodiment of the present invention.
Figure 2:
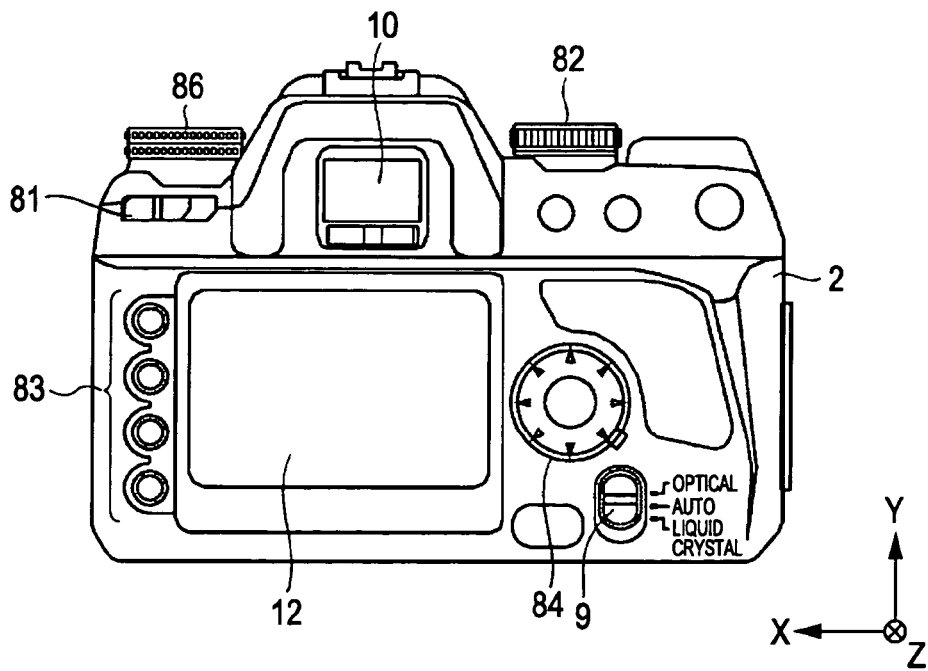
FIG. 2 is another diagram illustrating an external structure of the image pickup apparatus according to the first embodiment of the present invention.

FIGS. 1 and 2 are diagrams illustrating external views of an image pickup apparatus 1A according to a first embodiment of the present invention. Here, FIG. 1 is an external front view of the image pickup apparatus 1A. FIG. 2 is an external rear view of the image pickup apparatus 1A. The image pickup apparatus 1A is a single-lens reflex digital camera having a replaceable lens.

As shown in FIG. 1, the image pickup apparatus 1A includes a camera main body (camera body) 2. A replaceable image-capturing lens unit (replaceable lens) 3 is detachably attached to the camera main body 2.

The image-capturing lens unit 3 basically includes a barrel 13, a lens group 37 (refer to FIG. 3) disposed in the barrel 13, and an aperture stop (not shown). The lens group 37 includes a focusing lens which moves along an optical axis to change a focus position.

The camera main body 2 has an annular mount portion Mt, to which the image-capturing lens unit 3 is attached, at a central position on the front. A release button 89 for allowing the image-capturing lens unit 3 to be detached is provided near the annular mount portion Mt.

In addition, the camera main body 2 has a mode-setting dial 82 at an upper left position on the front and a control-value-setting dial 86 at an upper right position on the front. The mode-setting dial 82 is operated to set (switch between) various modes (image-capturing modes including a portrait mode, a landscape mode, and a continuous image-capturing mode, a reproducing mode for reproducing the captured images, a communication mode for communicating data with external apparatuses, etc.). In addition, the control-value-setting dial 86 is operated to set control values used in the respective image-capturing modes.

In addition, the camera main body 2 includes a grip portion 14 which can be gripped by a photographer at the left end on the front. A release button (shutter button) 11 for issuing a command to start exposure is provided on a top surface of the grip portion 14. A battery-accommodating chamber and a card-accommodating chamber are provided in the grip portion 14. The battery-accommodating chamber accommodates, for example, four AA batteries as a power source for the camera. The card-accommodating chamber accommodates a memory card 90 (refer to FIG. 5) in a detachable manner. The memory card 90 stores data of captured images.

The release button 11 is capable of detecting two states thereof: a half-pressed state (S1) and a fully pressed state (S2). When the release button 11 is pressed halfway and the state S1 is detected, preparation operations for capturing a still image of the object to be stored (an actually-captured image) are performed. For example, an AF control operation and an AE control operation are performed as preparation operations. When the release button 11 is further pressed and the state S2 is detected, the image-capturing operation for capturing the image to be stored is performed. In the image-capturing operation, an exposure operation for the object image is performed by using an image pickup device (also referred to as a "main image pickup device") 5 (described below) and an image signal obtained by the exposure operation is subjected to a series of image processing operations.

Referring to FIG. 2, a monitor 12 is provided at a central position on the back of the camera main body 2. The monitor 12 includes, for example, a color liquid crystal display (LCD). The monitor 12 displays a menu screen used for setting image-capturing conditions and the like. In addition, in the reproducing mode, the monitor 12 performs reproduction display of captured images stored in the memory card 90.

A finder window 10 is provided at an upper central position on the back of the camera main body 2. The object image obtained from the image-capturing lens unit 3 is guided to the finder window 10. By looking through the finder window 10, the photographer can visually check an image which is equivalent to the object image captured by the main image pickup device 5. More specifically, the object image incident on an image-capturing optical system is reflected upward by a mirror mechanism 6 (refer to FIG. 3) and is viewed by the photographer through an eyepiece 67. Thus, the photographer can determine the composition by looking through the finder window 10. In addition, when the state S2 of the release button 11 is detected and the image-capturing operation for capturing the image to be stored is started, the mirror mechanism 6 is removed from an optical path of the light which forms the object image. Accordingly, the light (light which forms the object image) from the image-capturing lens unit 3 reaches the main image pickup device 5 and a captured image (image data) of the object can be obtained.

A main switch 81 is provided at an upper left position of the monitor 12. The main switch 81 is a two-position slide switch. The power of the image pickup apparatus 1A is turned off when the main switch 81 is moved left to an OFF position, and is turned on when the main switch 81 is moved right to an ON position.

A direction selection key 84 and a display switch 9 are provided on the right of the monitor 12. The direction selection key 84 includes an annular operation button and is capable of individually detecting pressing operations of the operation button in four directions including top, bottom, left and right directions, and another four directions including upper left, upper right, lower left, and lower right directions. The direction selection key 84 is used in a menu operation performed on the menu screen, for example. In addition to the above-described pressing operations in the eight directions in total, the direction selection key 84 can also detect a pressing operation of a push button provided at the center.

The display switch 9 is a three-position slide switch. When the display switch 9 is at a position indicated as "OPTICAL" at the top, an optical view finder (OVF) mode is selected and the object image is displayed in the field of view of the optical finder. Accordingly, the photographer can perform the composition determination operation (also referred to as a "framing" operation) while visually checking the display of the object image in the field of view of the optical finder through the finder window 10.

In addition, when the display switch 9 is at a position indicated as "LIQUID CRYSTAL" at the bottom, an electronic view finder (EVF) mode (described hereinafter) is selected and a live view image of the object image is displayed on the monitor 12 as a moving image. Accordingly, the photographer can perform the framing operation while visually checking the live view image displayed on the monitor 12.

In addition, when the display switch 9 is at a position indicated as "AUTO" in the middle, switching between the display in the field of view of the optical finder and the live view is automatically performed depending on whether or not the photographer is looking through the finder window 10. Accordingly, the photographer can perform the framing operation while visually checking the display in the field of view of the optical finder or the display of the live view.

A setting button group 83 including a plurality of buttons for setting the menu screen, deleting images, etc., is provided on the left of the monitor 12.

Figure 3:
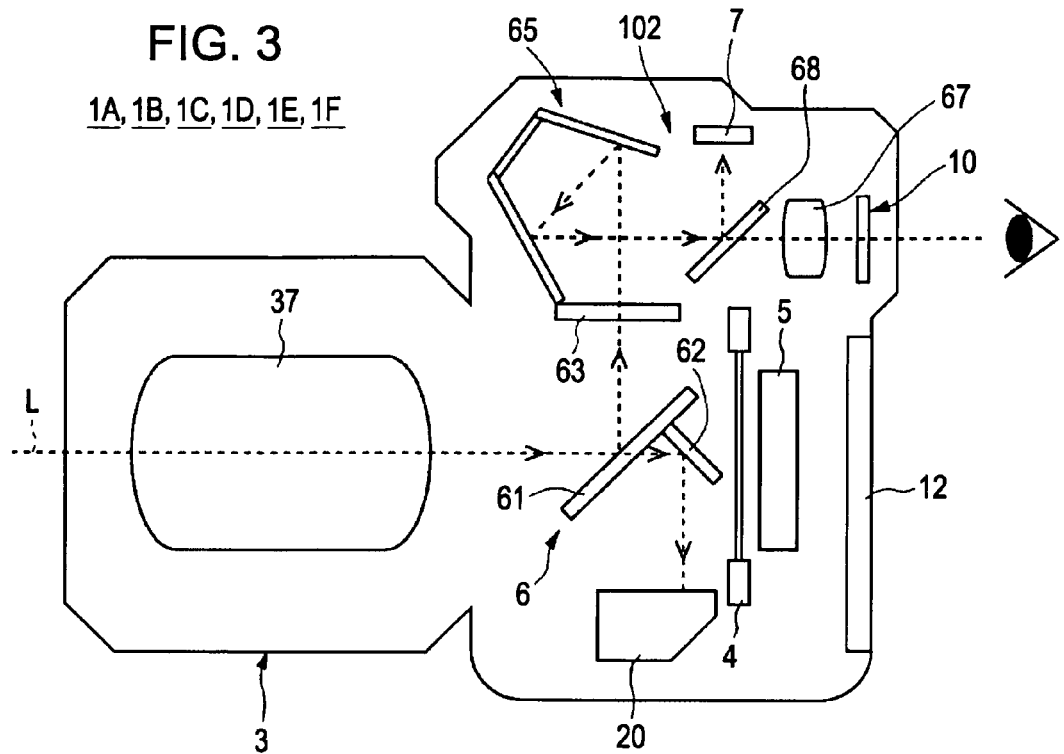
FIG. 3 is a vertical sectional view of the image pickup apparatus according to the first embodiment.
Figure 4:
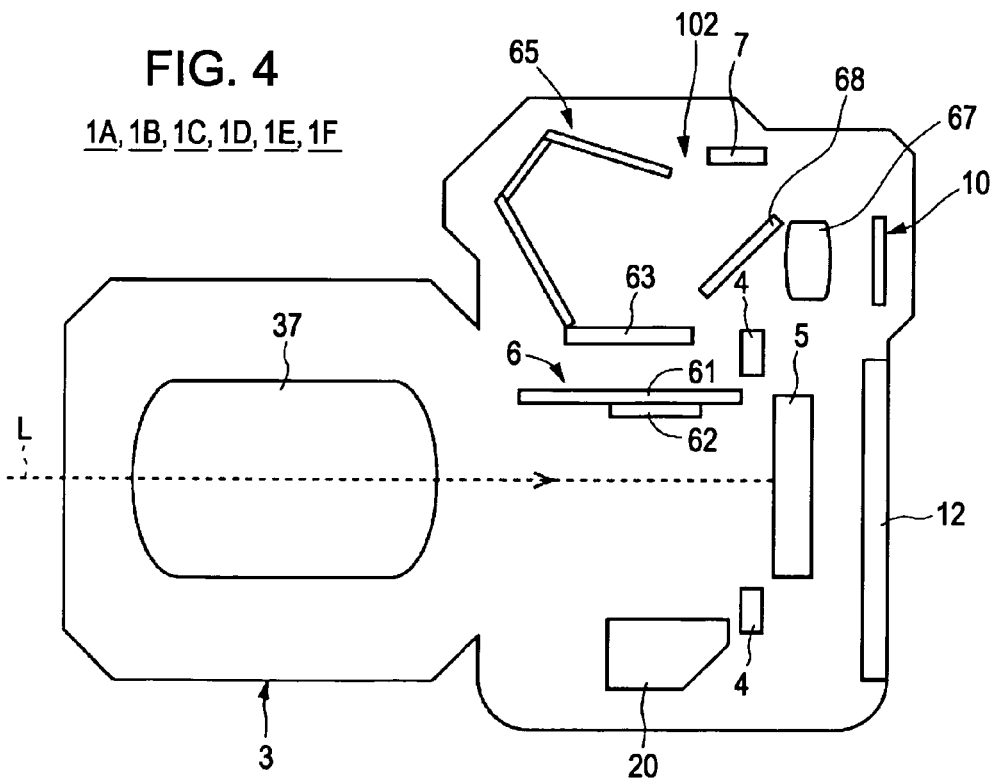
FIG. 4 is another vertical sectional view of the image pickup apparatus according to the first embodiment.

Next, the inner structure of the image pickup apparatus 1A will be described. FIGS. 3 and 4 are vertical sectional views of the image pickup apparatus 1A according to the first embodiment.

As shown in FIG. 3, the image pickup apparatus 1A includes a finder unit (also referred to as a "finder optical system") 102, the mirror mechanism 6, a phase-difference AF module (hereinafter also referred to simply as an AF module) 20, a shutter 4, the main image pickup device 5, and a sub image pickup device 7.

The main image pickup device (CCD sensor (also referred to simply as CCD) in this example) 5 is disposed on an optical axis L of a lens group 37 included in the image-capturing lens unit 3, and is arranged along a plane perpendicular to the optical axis L. The main image pickup device 5 receives an object image at an imaging surface thereof, and converts the received object image into an electric signal by photoelectric conversion. Thus, an image signal of the captured image to be stored is generated.

The shutter 4 is disposed immediately in front of the main image pickup device 5. The shutter 4 is a mechanical focal plane shutter which includes curtain members which move in the vertical direction, and performs an operation of opening and closing an optical path of the object light guided to the main image pickup device 5 along the optical axis L.

The mirror mechanism 6 (a reflective plate) is disposed at a position, at which the object light is reflected toward the finder unit 102, on the optical axis L. The object light that passes through the image-capturing lens unit 3 is reflected upward by the mirror mechanism 6 (a main mirror 61 hereinafter described) and is focused on a focusing glass 63 (a focusing screen).

The finder unit 102 includes a penta-mirror 65, a half mirror 68, the eyepiece 67, the sub image pickup device 7, and the finder window 10. The penta-mirror 65 reflects the object image such that an erect image is obtained by vertically and horizontally reversing the object image. The half mirror 68 is disposed between the penta-mirror 65 and the eyepiece 67 and separates (branches) the object light. One separated beam of the object light is guided to the eyepiece and the sub image pickup device 7 individually. The eyepiece 67 guides the separated object light to the outside of the finder window 10. Accordingly, the photographer can visually check the object image through the finder window 10. In this way, the finder unit 102 functions as an optical view finder (OVF) for checking the field of view for shooting when the photographer is waiting before an actual shooting operation.

In addition, the sub image pickup device 7 receives another separated beam of the object light that reaches the sub image pickup device 7, and successively obtains captured images corresponding to the object image. The captured images are successively displayed on the monitor 12 as a moving image (live view display). Accordingly, the sub image pickup device obtains the object image which can be visually checked through the finder window 10, and the photographer can visually check a live view image, which is displayed on the monitor 12, corresponding to the object image.

The mirror mechanism 6 includes the main mirror 61 and a submirror 62. On the rear side of the main mirror 61, the submirror 62 is provided so that the submirror 62 can rotate so as to move toward the rear surface of the main mirror 61. For example, the main mirror 61 includes a half mirror that allows a part of the object light to pass therethrough. The part of the object light passes through the main mirror 61, is reflected by the sub mirror 62, and is incident on the AF module 20.

The mirror mechanism 6 is formed as a so-called quick return mirror. Then, the mirror mechanism 6 is lifted upward during the exposure operation when the state S2 of the release button 11 is detected, and is stopped at a position under the focusing glass 63 (refer to FIG. 4). Thus, the object light coming through the image-capturing lens unit 3 reaches the main image pickup device 5 without being blocked by the mirror mechanism 6, whereby the main image pickup device 5 is exposed. Upon completion of the exposure, the mirror mechanism 6 is returned to the original position (the position shown in FIG. 3).

The AF module 20 includes a so-called AF sensor including a macrometer sensor which detects focus information of an object. More specifically, the AF module 20 has a phase-difference detection function of receiving the object light (in detail, light that has entered through the mirror mechanism 6) from distance measurement areas (also referred to as "focus areas" or "AF areas") set in the image capturing area and generating a phase-difference detection signal corresponding to the focus state of the object image.

[1-2. Functional Blocks]

Figure 5:
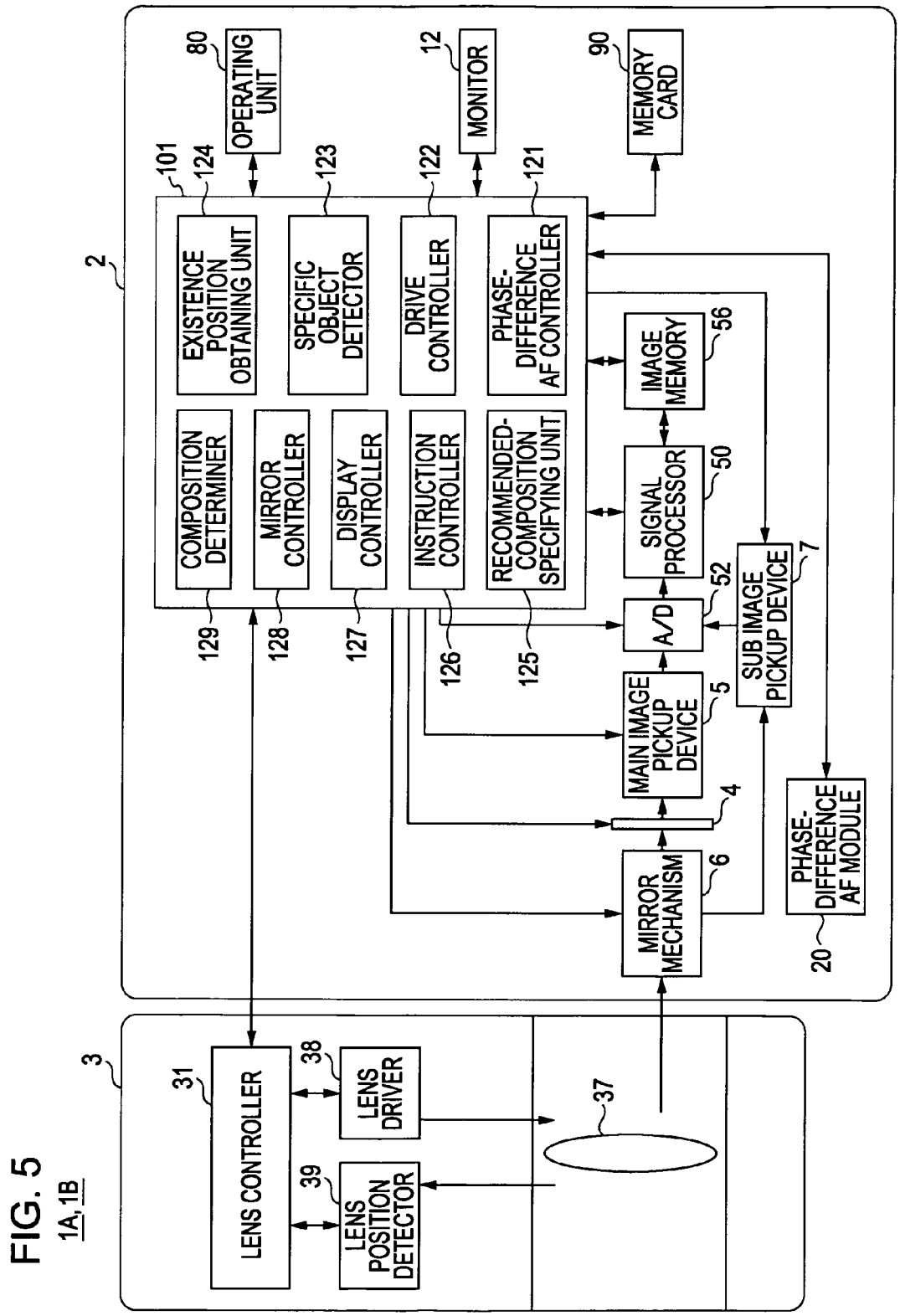
FIG. 5 is a block diagram illustrating the functional structure of the image pickup apparatus according to the first embodiment.
Figure 6:
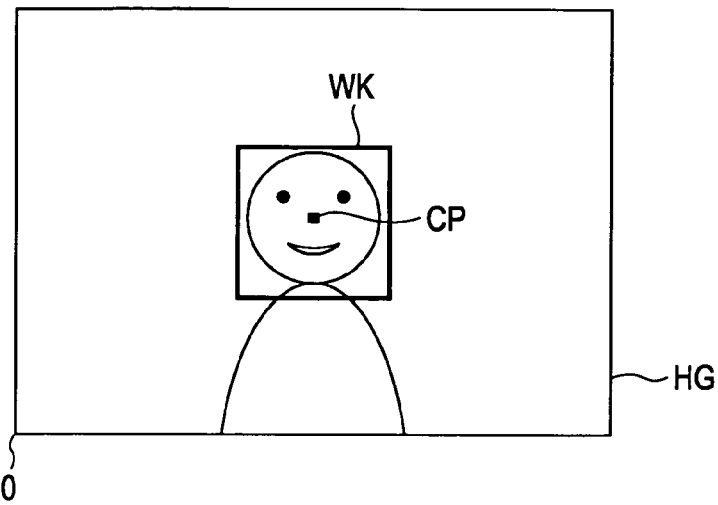
FIG. 6 is a diagram illustrating an auxiliary image including a facial area as a specific object.
Figure 7:
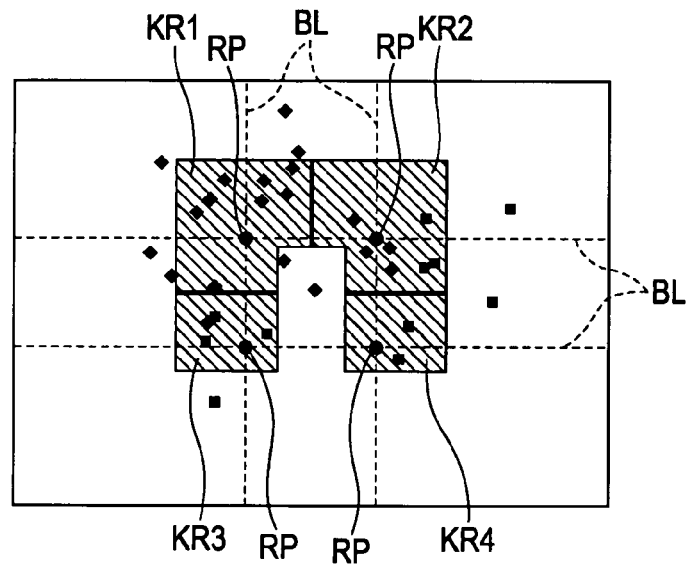
FIG. 7 is a diagram illustrating a golden section composition.
Figure 8:
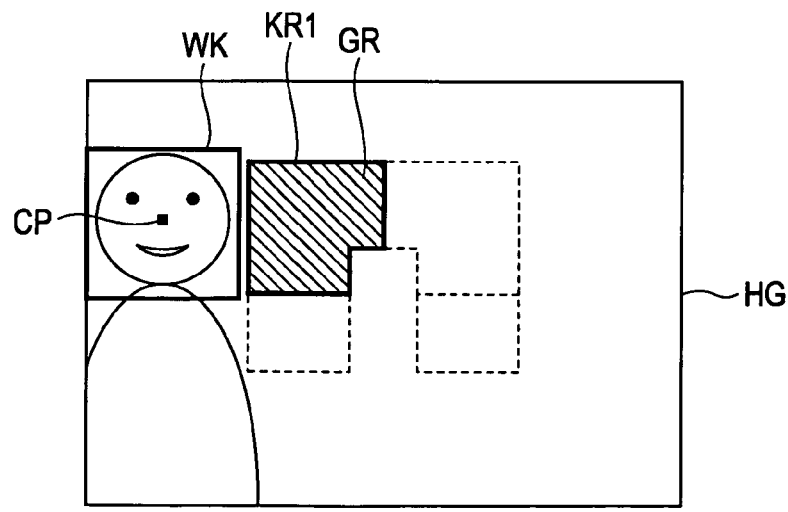
FIG. 8 is a diagram virtually illustrating a recommended candidate area on the auxiliary image.
Figure 9:
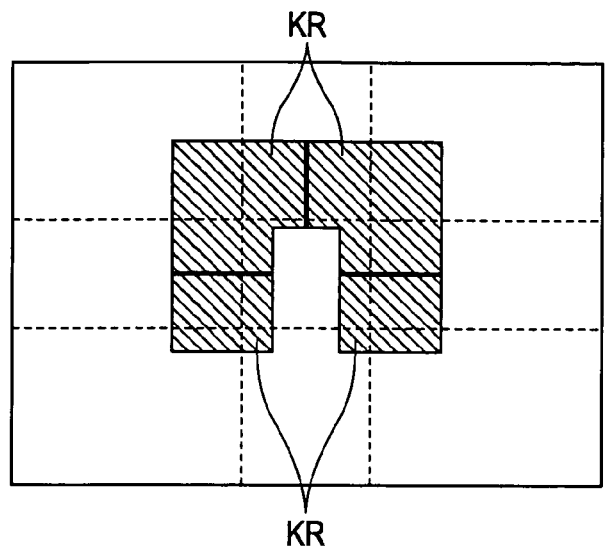
FIG. 9 is a diagram illustrating a composition based on the Rule of Thirds.
Figure 10:
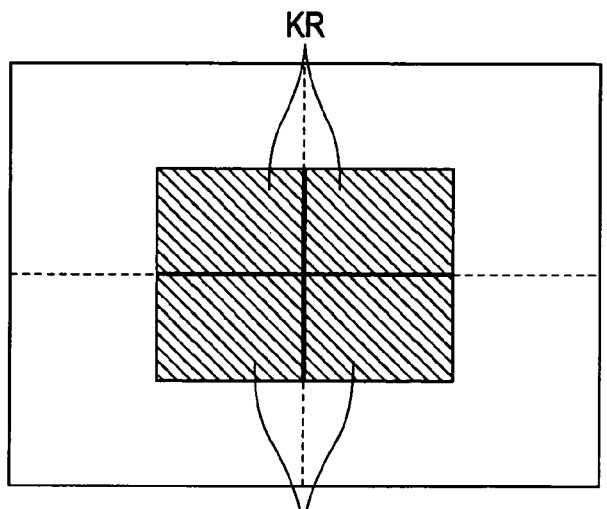
FIG. 10 is a diagram illustrating a bisection composition.
Figure 11:
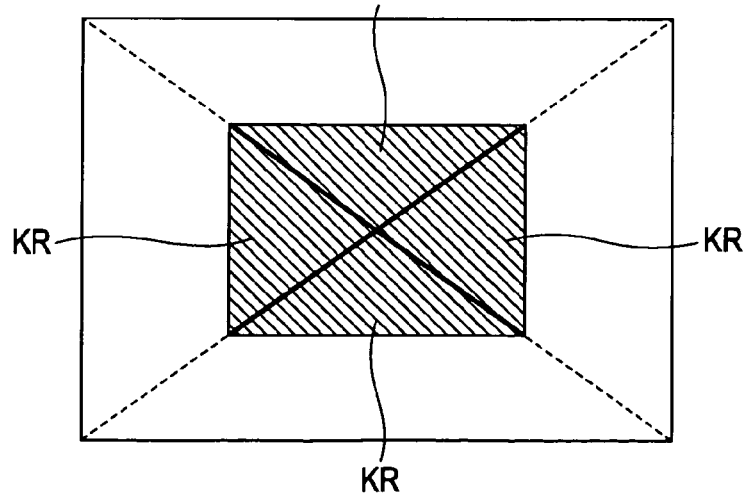
FIG. 11 is a diagram illustrating an oblique bisection composition.
Figure 12:
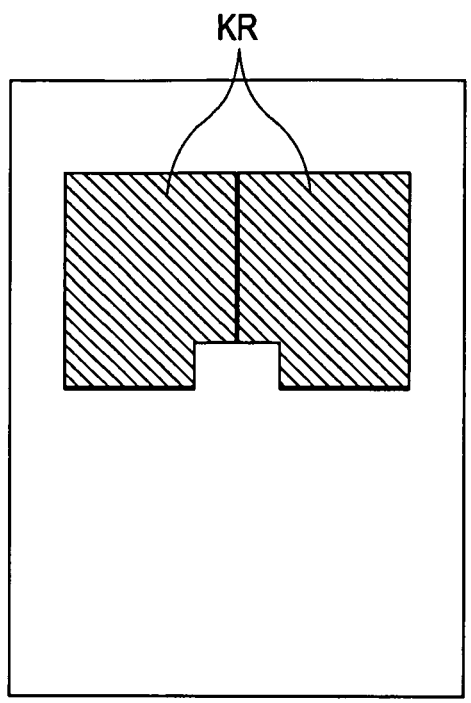
FIG. 12 is a diagram illustrating a golden section composition when holding the image pickup apparatus in the longitudinal position.
Figure 13:
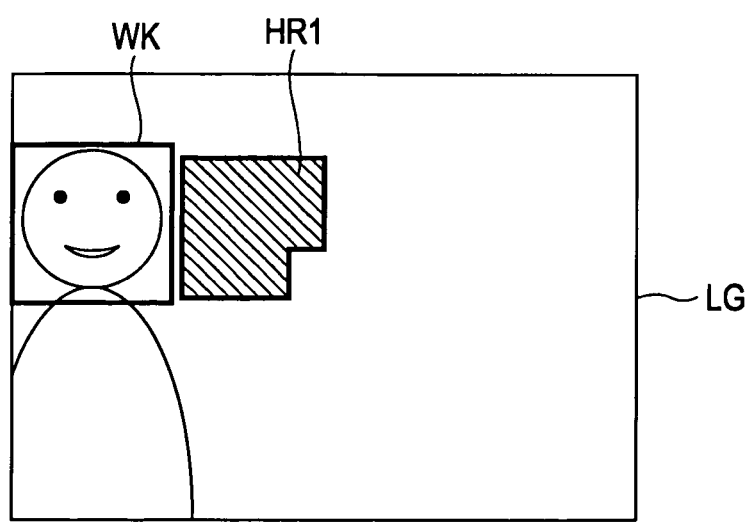
FIG. 13 is a diagram illustrating an example of a display of a live view image.

Functions of the image pickup apparatus 1A will now be described. FIG. 5 is a block diagram illustrating the functional structure of the image pickup apparatus 1A according to the first embodiment. FIG. 6 is a diagram illustrating an auxiliary image HG including a facial area as a specific object. FIG. 7 is a diagram illustrating a golden section composition. FIG. 8 is a diagram virtually illustrating a recommended candidate area on the auxiliary image HG. FIG. 9 is a diagram illustrating a composition based on the Rule of Thirds. FIG. 10 is a diagram illustrating a bisection composition. FIG. 11 is a diagram illustrating an oblique bisection composition. FIG. 12 is a diagram illustrating a golden section composition when holding the image pickup apparatus 1A in the longitudinal position. FIG. 13 is a diagram illustrating an example of a display of a live view image.

As shown in FIG. 5, the image pickup apparatus 1A includes the phase-difference AF module 20, an operating unit 80, an overall controller 101, the mirror mechanism 6, the shutter 4, the main image pickup device 5, an A/D converter circuit 52, a digital signal processor circuit 50, and an image memory 56.

The operating unit 80 includes various switches and buttons including the release button 11 (refer to FIG. 1). The overall controller 101 performs various operations in response to an input operation performed by the user using the operating unit 80.

The main image pickup device 5 receives drive control signals (an accumulation start signal and an accumulation stop signal) from a timing control circuit (not shown), and performs an exposure operation (charge accumulation performed by causing photoelectric conversion) for an object image formed on a light-receiving surface (imaging surface) in response to the received drive control signals. As a result, an image signal corresponding to the object image is obtained.

In addition, the sub image pickup device 7 basically has a function similar to that of the main image pickup device 5. Then, the sub image pickup device 7 performs an exposure operation for an object image guided to the finder optical system, and obtains an image signal corresponding to an image to be displayed as a live view image.

The image signal (analog signal) obtained by the main image pickup device 5 is converted into a digital signal by the A/D converter circuit 52. The thus-obtained digital image signal is input to the digital signal processor circuit 50.

The digital signal processor circuit 50 subjects the image signal input from the A/D converter circuit 52 to digital signal processes. More specifically, a black-level correction process, a white balance (WB) process, a gamma correction process, etc., are performed. After the signal processes, the image signal (image data) is stored in the image memory 56.

The image memory 56 is a high-speed-accessible image memory for temporarily storing the generated image data and has a capacity large enough to store data corresponding to a plurality of frames of images.

In the image-capturing operation for capturing an image to be stored, the image data that is temporarily stored in the image memory 56 is subjected to image processing (for example, compression processing) by the overall controller 101 as necessary, and is then stored in the memory card 90.

In addition, the image data obtained by the sub image pickup device 7 is subjected to predetermined processes by the A/D converter circuit 52 and the digital signal processor circuit 50. Then, the thus-processed data is temporarily stored in the image memory 56 and is displayed on the monitor 12.

The overall controller 101 includes a microcomputer, and basically includes a CPU, a memory, and a ROM, etc. The overall controller 101 reads out programs stored in the ROM and causes the CPU to execute the programs, thereby carrying out various functions.

The overall controller 101 executes the above-mentioned programs to carry out the functions of a phase-difference AF controller 121, a drive controller 122, a specific object detector 123, an existence position obtaining unit 124, a recommended-composition specifying unit 125, an instruction controller 126, a display controller 127, a mirror controller 128, and a composition determiner 129, etc.

The phase-difference AF controller 121 performs an autofocus (AF) operation (phase-difference AF operation) by the phase-difference AF method. More specifically, the phase-difference AF controller 121 performs a lens-focus-position determination operation for determining the position (lens focus position) of the image taking lens (to be more specific, the focusing lens) in a focused state on the basis of the phase-difference detection signal output from the AF module 20.

In addition, the phase-difference AF controller 121 operates in association with the drive controller 122 to perform a lens-driving operation for moving the image taking lens (focusing lens) to the determined lens focus position. More specifically, the phase-difference AF controller 121 transmits a control signal to a lens controller 31 included in the image-capturing lens unit 3 via the drive controller 122. Accordingly, the lens driver 38 is driven so as to move the focusing lens included in the lens group 37 in the image-capturing lens unit 3 along an optical axis. In addition, the position of the focusing lens is detected by a lens position detector 39 included in the image-capturing lens unit 3, and data representing the position of the focusing lens is transmitted from the lens controller 31 to the overall controller 101 in the camera main body 2.

The specific object detector 123 detects a specific object in a captured image (auxiliary image) HG obtained by the sub image pickup device 7. In this example, it is illustrated that a person's face (also referred to as a "face of an object" or simply a "facial area") is detected as the specific object in the auxiliary image HG. The facial area may be detected by, for example, the following method. That is, first, a skin-colored area is extracted from the captured image on the basis of the pixel value of each pixel in the auxiliary image HG. Then, if the area of the extracted skin-colored area is equal to or larger than a predetermined threshold, it is determined that the skin-colored area is a person's face. Alternatively, a person's face may also be detected by extracting specific parts, such as eyes and/or a mouth, of a person's face from the captured image by a common pattern recognition method.

The specific object detector 123 determines an orientation of the detected face. The specific object detector 123 can determine three directions including a left direction, a right direction, and a front direction. The face orientation is determined by, for example, the following method. That is, first, a plurality of face models corresponding to various face orientations respectively are stored in the ROM as reference data in advance. Then, the orientation of the detected face is determined on the basis of which face model is similar to the detected face in the orientation thereof.

In addition, the specific object detector 123 performs the detection of the facial area and the face orientation when a face detection function is enabled by the menu operation on the menu screen in the EVF mode.

The existence position obtaining unit 124 obtains the position at which the specific object (in this example, person's face) detected by the specific object detector 123 exists in the auxiliary image HG. More specifically, as shown in FIG. 6, the existence position obtaining unit 124 sets a rectangular face frame WK for the detected facial area, the face frame WK surrounding the detected facial area, and determines a center position CP of the set face frame WK. Then, when the bottom left corner of the captured image is regarded as an origin O, the existence position obtaining unit 124 obtains the coordinates of the center position CP of the captured image as a current existence position (also referred to as "current position").

The recommended-composition specifying unit 125 specifies, on the basis of the existence position of the specific object, a recommended composition of the object (also referred to as "recommended composition") which is recommended when the specific object is viewed (regarded) as a main object. According to the embodiment, the recommended-composition specifying unit 125 selects an area recommended as a layout of the specific object (also referred to as "a recommended existence area" or "a recommended area") among areas in which the main object is intended to exist (also referred to as "recommended candidate areas"), and thereby specifies the recommended composition.

More specifically, the case that recommended candidate areas KR1 to KR4 (diagonally hatched areas) are set as the recommended candidate areas as shown in FIG. 7 will be described. The recommended candidate areas KR1 to KR4 are areas which include intersections RPs between division lines BLs in a golden section composition in which the image capturing area is divided on the basis of a golden ratio (about 1:1.618). In addition, the recommended candidate areas KR1 to KR4 are areas which are set on the basis of statistical distribution of a face viewed (regarded) as the main object in the captured image. In this case, when the facial area viewed (regarded) as the specific object is detected at a position shown in FIG. 8, the recommended-composition specifying unit 125 selects, as a recommended existence area GR, the recommended candidate area KR1 which is located at the closest position to the center position CP of the facial area.

In addition, the recommended candidate area KR may be set on the basis of the composition based on the Rule of Thirds shown in FIG. 9, the bisection composition shown in FIG. 10, or the oblique bisection composition shown in FIG. 11. Then, when the image pickup apparatus 1A is hold in the longitudinal position thereof, the recommended candidate area KR is set on the basis of the longitudinal golden section composition shown in FIG. 12.

The instruction controller 126 instructs the execution of a predetermined operation which notifies the user of the recommended composition specified by the recommended-composition specifying unit 125. More specifically, when the recommended candidate area KR1 is selected as the recommended existence area GR as shown in FIG. 8, the instruction controller 126 instructs the display controller 127 to execute a display operation which notifies the user of the recommended existence area GR.

The display controller 127 controls display contents shown on a display unit including the monitor 12. For example, the display controller 127 causes the monitor 12 to display a live view image LG on the basis of captured images which are continuously obtained by the sub image pickup device 7.

In addition, the display controller 127 has a function of causing the live view image, combined with an additional display, to be displayed. More specifically, as shown in FIG. 13, the display controller 127 causes the live view image, combined with the face frame WK surrounding the detected facial area, to be displayed. In addition, the display controller 127 causes the live view image, combined with a display indicating the recommended existence area GR, to be displayed when receiving the instruction of executing from the instruction controller 126. For example, when the recommended candidate area KR1 is selected as the recommended existence area GR, the display controller 127 causes the live view image, combined with a display HR1 indicating the recommended existence area GR, to be displayed as shown in FIG. 13.

The mirror controller 128 controls the operation of switching between the state in which the mirror mechanism 6 is removed from the optical path (mirror-up state) and the state in which the mirror mechanism 6 blocks the optical path (mirror-down state). The mirror controller 128 switches between the mirror-up state and the mirror-down state by driving a mirror switch motor (not shown).

The composition determiner 129 has a function of determining whether or not a current composition of the object (also referred to as "a current composition") conforms to (coincides with) the recommended composition. More specifically, on the basis of the existence position of the facial area viewed (regarded) as the specific object, the composition determiner 129 determines whether or not the facial area exists in the recommended existence area GR. The determination of whether or not the facial area exists in the recommended existence area GR is performed on the basis of a determination of whether or not the center position CP of the facial area is included in the recommended existence area GR. Then, the determination of whether or not the center position CP of the facial area is included in the recommended existence area GR is performed on the basis of the comparison of the coordinates of each pixel in the recommended existence area GR with the coordinates of the existence position of the facial area, namely, the center position CP of the facial area. In addition, the existence ranges of the recommended candidate areas KRs in the captured image are obtained in advance, respectively. Then, the existence range of the recommended existence area GR in the captured image can be determined on the basis of the existence range of a corresponding recommended candidate area KR.

[1-3. Operation]

Figure 14:
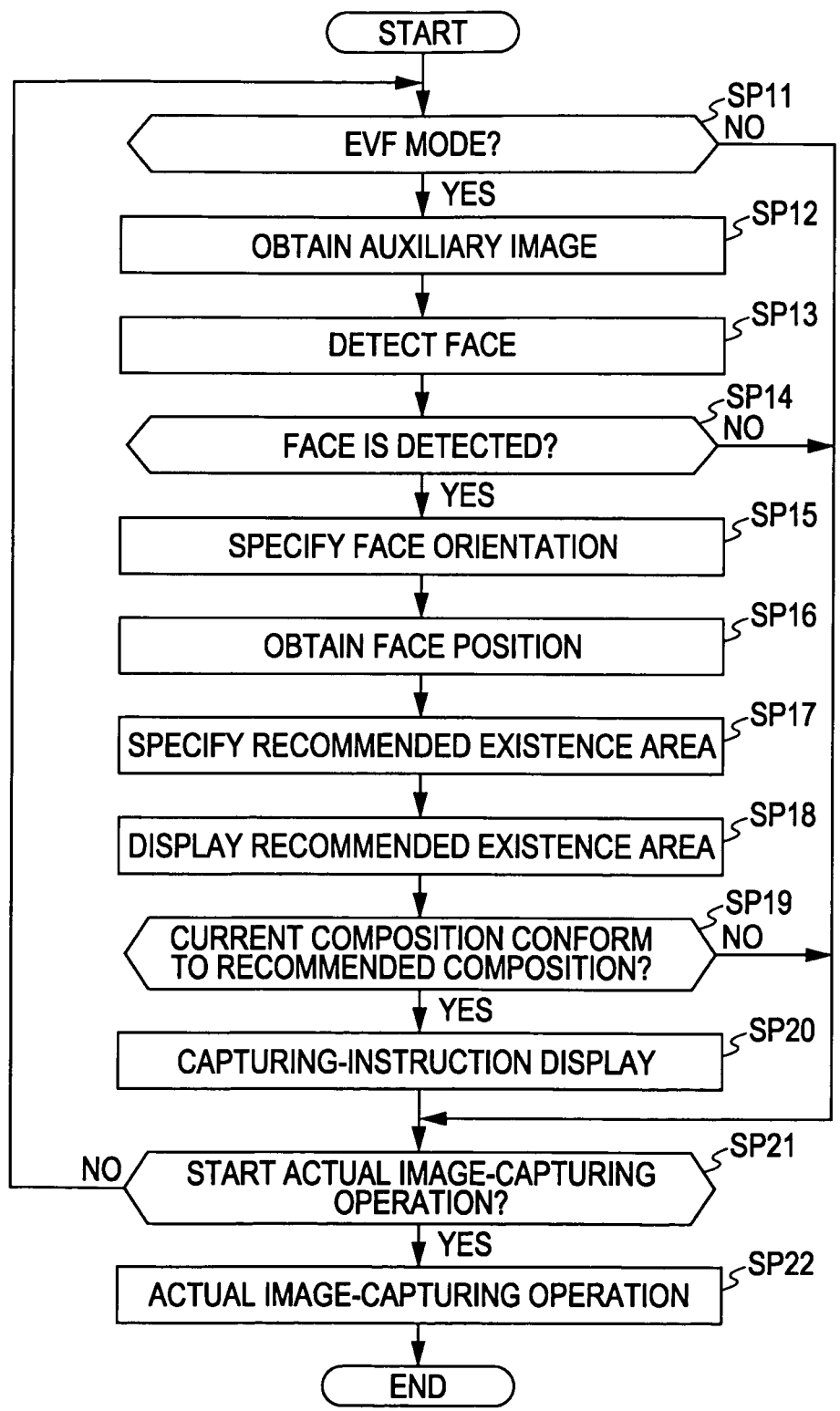
FIG. 14 is a flowchart illustrating an operation of the image pickup apparatus according to the first embodiment.
Figure 15:
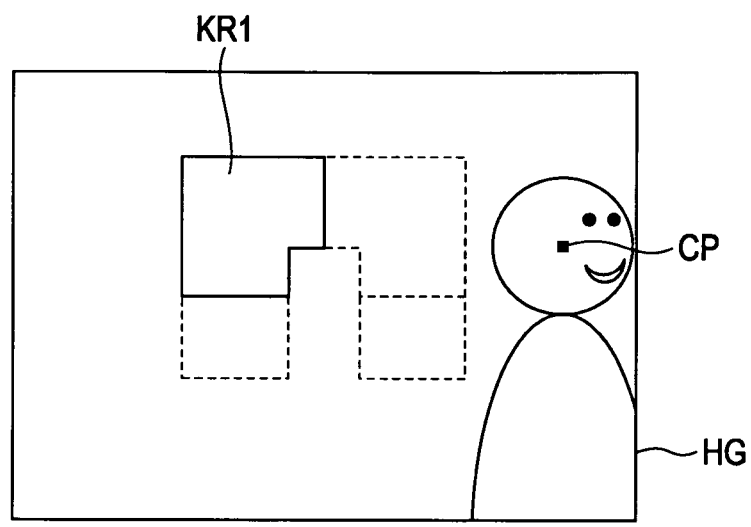
FIG. 15 is a diagram illustrating an auxiliary image including a facial area.
Figure 16:
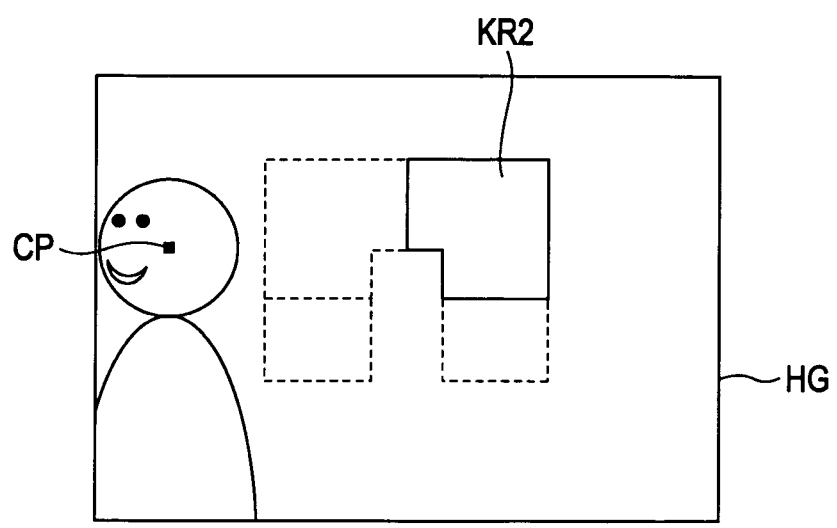
FIG. 16 is a diagram illustrating an auxiliary image including a facial area.
Figure 17:
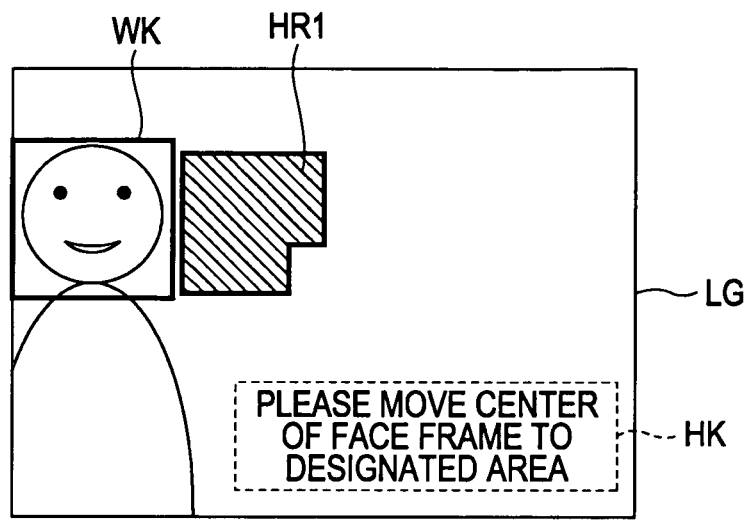
FIG. 17 is a diagram illustrating an example of a display of a live view image.
Figure 18:
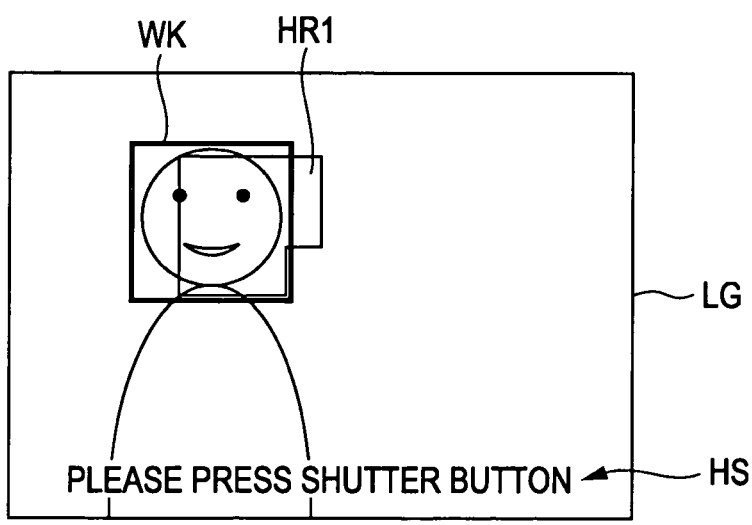
FIG. 18 is a diagram illustrating an example of a display of a live view image.

Next, an operation of the image pickup apparatus 1A when the face detection function is enabled will be described. FIG. 14 is a flowchart illustrating the operation of the image pickup apparatus 1A. FIGS. 15 and 16 are diagrams illustrating the auxiliary image HG including a facial area. FIGS. 17 and 18 are diagrams illustrating examples of a display of a live view image.

More specifically, as shown in FIG. 14, first, in Step SP11 it is determined whether or not the EVF mode is selected. When the EVF mode is not selected (the OVF mode is selected), operation process shifts to Step SP21 and a normal image-capturing operation is executed in the OVF mode. On the other hand, when the EVF mode is selected, the operation process shifts to Step SP12.

In Step SP12, an auxiliary image is obtained by the sub image pickup device 7.

Then, in Step SP13, the face detection operation is executed in the specific object detector 123 and a person's face (facial area) is detected as a specific object in the auxiliary image.

In Step SP14, it is determined whether or not the facial area is detected in the auxiliary image. When the facial area is not detected, the operation process shifts to Step SP21 and the normal image-capturing operation is executed. On the other hand, when the facial area is detected, the operation process shifts to Step SP15.

In Step SP15, the specific object detector 123 specifies a face orientation.

In Step SP16, the existence position obtaining unit 124 obtains the current existence position of the face.

In Step SP17, the recommended-composition specifying unit 125 specifies an area (a recommended existence area), which is recommended as a layout of the detected face, on the basis of the face orientation and the existence position of the face.

More specifically, when the face orientation is the front direction, the recommended candidate area KR1 which is located at the closest position to the existence position of the face is specified as the recommended existence area GR (refer to FIG. 8).

In addition, when the face orientation is the left direction or the right direction, the recommended candidate area KR1 which causes one space in the face orientation with reference to the position of the face to become larger than another space in the opposite direction of the face orientation is specified as the recommended existence area GR. For example, as shown in FIG. 15, when the orientation of the face in the captured image is the user's right direction, the recommended candidate area KR1 which causes one space in the right direction with reference to the center position CP of the facial area to become larger than another space in the left direction is specified as the recommended existence area GR. In addition, as shown in FIG. 16, when the orientation of the face in the captured image is the user's left direction, the recommended candidate area KR1 which causes one space in the left direction with reference to the center position CP of the facial area to become larger than another space in the right direction is specified as the recommended existence area GR.

In Step SP18, in response to an instruction from the instruction controller 126, the display controller 127 causes the live view image, combined with the display HR1 indicating the recommended existence area GR, to be displayed (refer to FIG. 13). Accordingly, the user can comprehend a recommended layout (also referred to as "recommended position") of the face by visually checking the monitor 12. In addition, in Step SP18, the display controller 127 may cause the live view image LG, combined with a display HK prompting the user to modify a composition, in addition to the display HR1 indicating the recommended existence area GR, to be displayed, as shown in FIG. 17.

In Step SP19, the composition determiner 129 determines whether or not the current composition conforms to the recommended composition, namely, whether or not the face exists in the recommended existence area GR. As shown in FIG. 18, when it is determined that the face exists in the recommended existence area GR, the operation process shifts to Step SP20. In Step SP20, in response to an instruction from the instruction controller 126, the display controller 127 causes the live view image LG, combined with a display HS (also referred to as "capturing-instruction display") prompting the user to perform an image-capturing operation, to be displayed (refer to FIG. 18).

On the other hand, when it is not determined that the face exists in the recommended existence area GR, the operation process shifts to Step SP21.

In next Step SP21, whether or not an image-capturing operation for capturing an image to be stored (an actual image-capturing operation) is to be started is determined on the basis of a pressed down state of the release button 11. When the fully-pressed state of the release button 11 is not detected, the operation process shifts to Step SP11. Then, until the fully-pressed state of the release button 11 is detected, processes in from Step SP11 through Step SP21 are performed repeatedly. Even in the case that the capturing-instruction display HS is not executed at the beginning of the operation, when the face becomes to be included in the recommended existence area GR through the user's framing during the repeated processes or the movement of the object, etc., the process shifts to Step SP20 via Step SP19 and thereby the capturing-instruction display HS is executed.

In addition, when in Step SP21 the fully-pressed state of the release button 11 is detected, the process shifts to Step SP22 and thereby the image-capturing operation for capturing an image to be stored (an actual image-capturing operation) is performed.

As described above, according to the embodiment, the image pickup apparatus 1A including specific object detector 123 configured to detect the specific object in the auxiliary image obtained by the sub image pickup device 7, the position obtaining unit 124 configured to obtain the position of the specific object in the auxiliary image, the recommended-composition specifying unit 125 configured to specify, on the basis of the existence position of the specific object, the recommended composition which is recommended when the specific object is viewed as the main object, and the instruction controller 126 configured to instruct the execution of the predetermined operation which notifies the user of the recommended composition. When the user uses such image pickup apparatus as the image pickup apparatus 1A, the user can perform the image-capturing operation with the help of the recommended composition. Therefore, a captured image with a good composition can be obtained and the user's image-capturing skill can be improved. In addition, since the user can perform the image-capturing operation with the help of the recommended composition, the time necessary for determining a composition can be reduced.

2. Second Embodiment

Next, a second embodiment according to the present invention will be described. In an image pickup apparatus 1B according to the second embodiment, the display control of the display HR1 indicating the recommended existence area GR is performed according to whether or not the current composition conforms to the recommended composition, in more detail, whether or not the facial area viewed (regarded) as the specific object exists in the recommended existence area GR. In addition, except for the point that the display control of the display HR1 indicating the recommended existence area GR is performed according to whether or not the facial area viewed (regarded) as the specific object exists in the recommended existence area GR, the image pickup apparatus 1B has almost the same structure and functions (refer to FIGS. 1 to 5) as the image pickup apparatus 1A. Therefore, the same symbols are assigned to common components and description thereof will be omitted.

As described above, in the image pickup apparatus 1B, the display control of the display HR1 indicating the recommended existence area GR is performed according to whether or not the current composition conforms to the recommended composition, in detail, whether or not the facial area exists in the recommended existence area GR. The determination of whether or not the facial area exists in the recommended existence area GR is performed by the composition determiner 129 (refer to FIG. 5).

Then, the instruction controller 126 in the image pickup apparatus 1B instructs the execution of a predetermined operation which notifies the user of the recommended composition, according to the determination result of the composition determiner 129. More specifically, when the composition determiner 129 determines that the facial area does not exist in the recommended existence area GR, the instruction controller 126 instructs the execution of the predetermined operation. Then, when the composition determiner 129 determines that the facial area exists in the recommended existence area GR, the instruction controller 126 does not instruct the execution of the predetermined operation.

Figure 19:
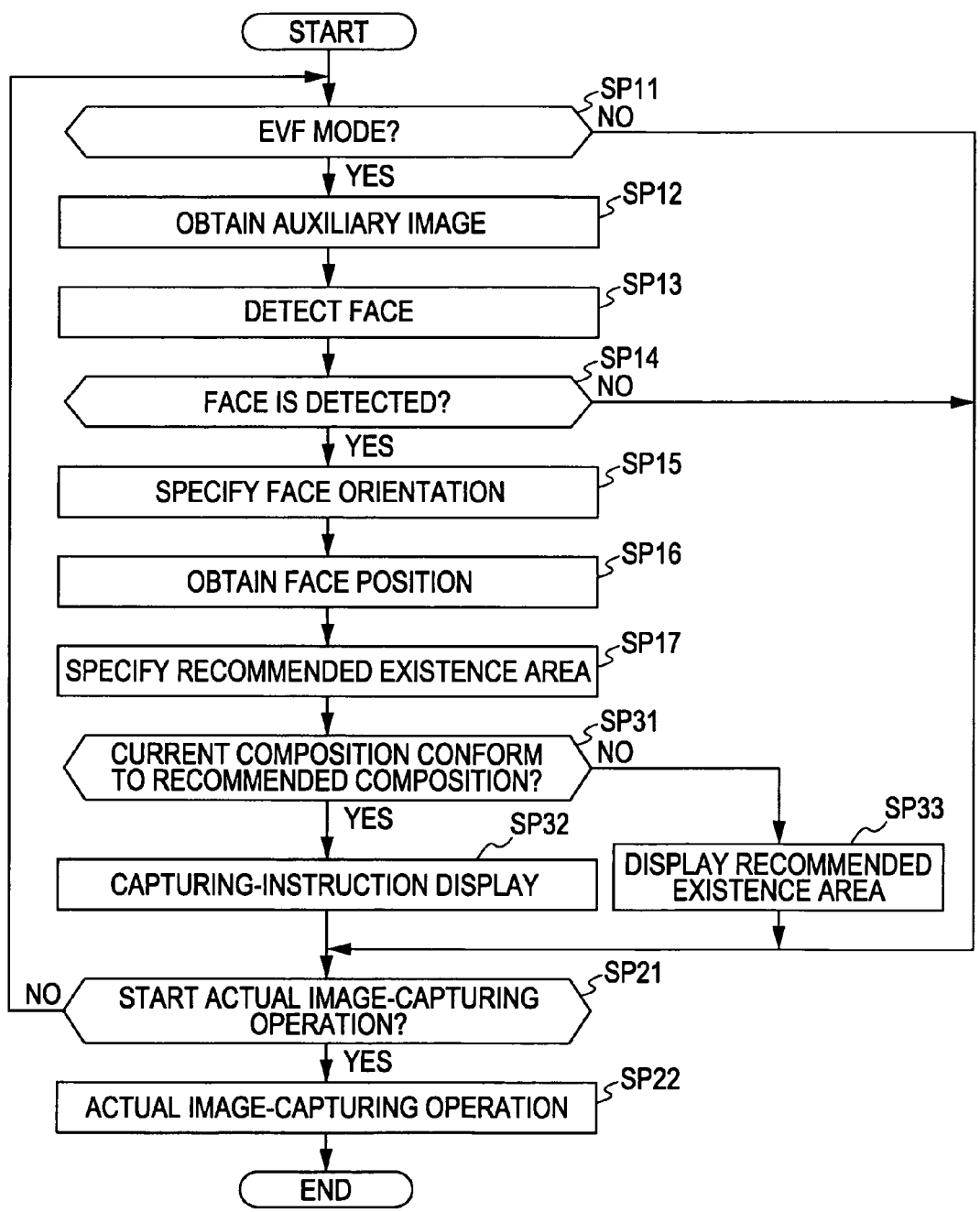
FIG. 19 is a flowchart illustrating an operation of an image pickup apparatus according to a second embodiment.

Here, an operation of the image pickup apparatus 1B will be described. FIG. 19 is a flowchart illustrating the operation of the image pickup apparatus 1B.

As shown in FIG. 19, in the image pickup apparatus 1B, the same operation as in the image pickup apparatus 1A are executed in from Step SP11 through Step SP17 respectively. Simply stated, after a person's face is detected in the auxiliary image to be the live view image, the face orientation and the existence position of the detected face are obtained. Then, an area which is recommended as a layout of the detected face (a recommended existence area) is specified on the basis of the face orientation and the existence position of the face (Step SP17).

In next Step SP31, the composition determiner 129 determines whether or not the current composition conforms to the recommended composition. In Step SP31, when it is determine that the current composition does not conform to the recommended composition, in detail, the face does not exist in the recommended existence area GR, the operation process shifts to Step SP33.

In Step SP33, in response to an instruction from the instruction controller 126, the display controller 127 causes the live view image, combined with the display HR1 indicating the recommended existence area GR, to be displayed (refer to FIG. 13). Accordingly, the user can comprehend the recommended layout of the face by visually checking the monitor 12.

On the other hand, when in Step SP31 it is determined that the current composition conforms to the recommended composition, in detail, the face exists in the recommended existence area GR, the operation process shifts to Step SP32 with executing no display operation of the display HR1 indicating the recommended existence area GR. In Step SP32, in response to an instruction from the instruction controller 126, the display controller 127 causes the display HS prompting the user to perform an image-capturing operation to be displayed on the monitor 12.

In Step SP21, whether or not an image-capturing operation for capturing an image to be stored is to be started is determined on the basis of a pressed down state of the release button 11. When the fully-pressed state of the release button 11 is not detected, the operation process shifts to Step SP11. Then, until the fully-pressed state of the release button 11 is detected, processes in from Step SP11 through Step SP17, in from Step SP31 through Step SP33, and in Step SP21 are performed repeatedly.

On the other hand, when the fully-pressed state of the release button 11 is detected, the process shifts to Step SP22 and thereby the image-capturing operation for capturing an image to be stored (an actual image-capturing operation) is performed.

As described above, when the composition determiner 129 determines that the facial area does not exist in the recommended existence area GR, the instruction controller 126 in the image pickup apparatus 1B instructs the execution of the display operation of the display HR1 indicating the recommended existence area GR. On the other hand, when the composition determiner 129 determines that the facial area exists in the recommended existence area GR, the instruction controller 126 does not instruct the execution of the display operation of the display HR1 indicating the recommended existence area GR. Accordingly, when the facial area exists in the recommended existence area GR, the display HR1 indicating the recommended existence area GR can be prevented from being annoyingly displayed on the monitor 12, and thereby the visibility of the monitor 12 can be improved.

3. Third Embodiment

Figure 20:
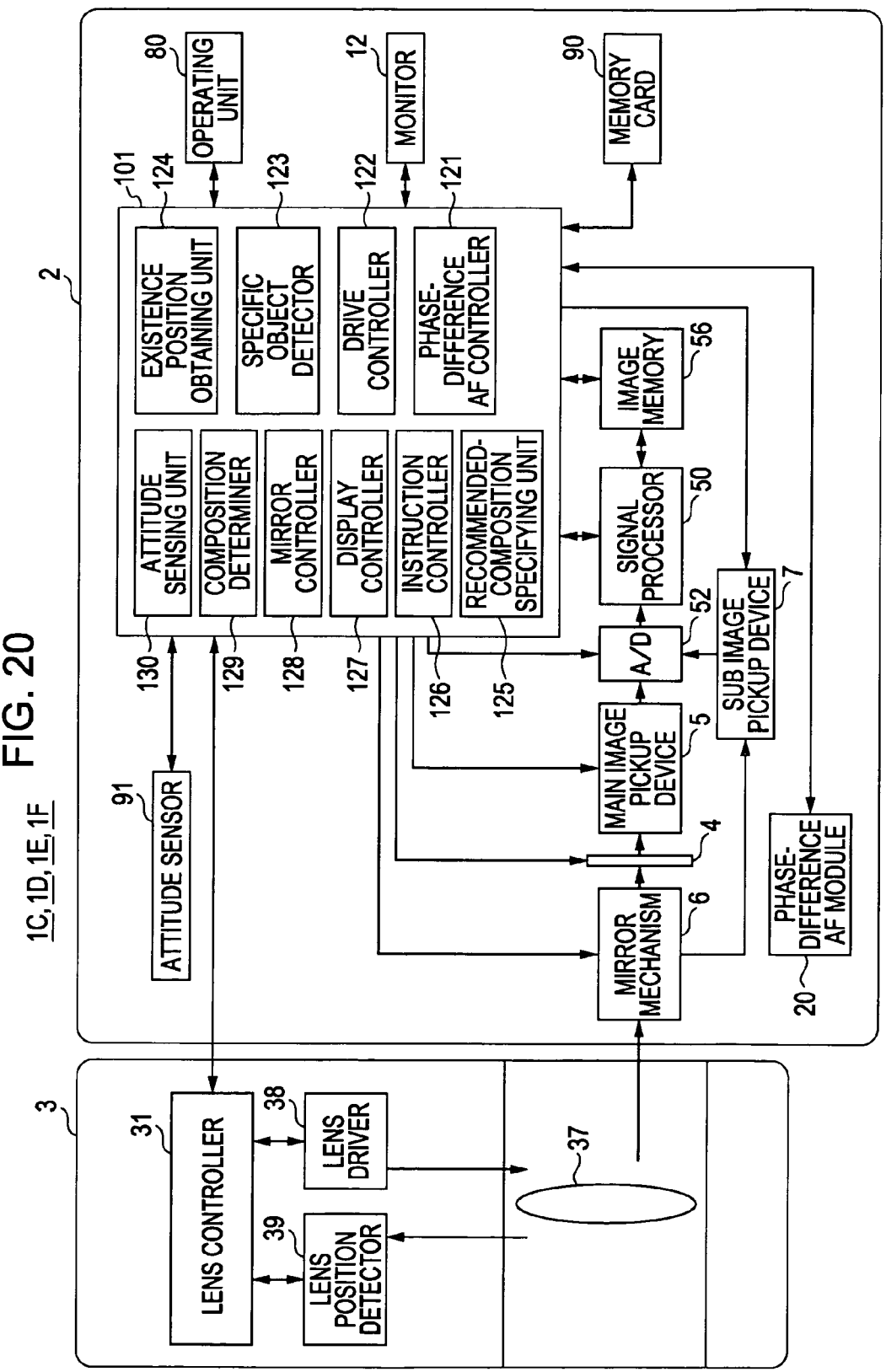
FIG. 20 is a block diagram illustrating the functional structure of the image pickup apparatus.
Figure 24:
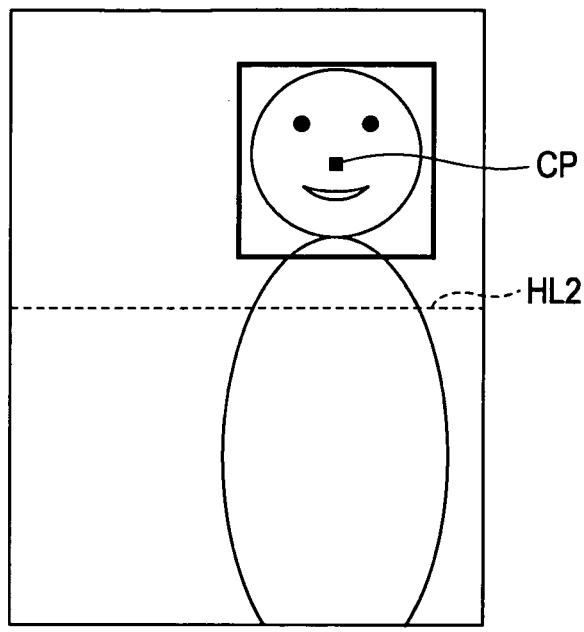
FIG. 24 is a diagram illustrating an auxiliary image including a facial area.
Figure 25:
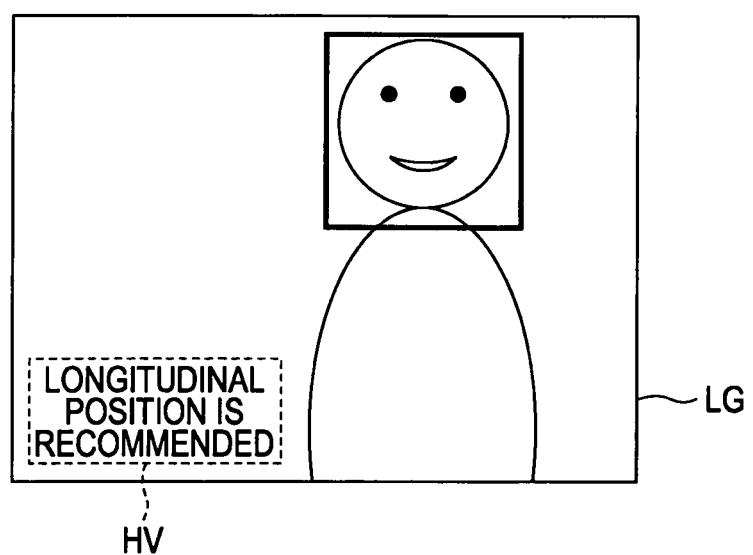
FIG. 25 is a diagram illustrating an example of a display of a live view image.

Next, a third embodiment according to the present invention will be described. While in the above-mentioned image pickup apparatuses 1A and 1B the recommended existence area is specified as the recommended composition, in an image pickup apparatus 1C according to the third embodiment a recommended holding direction of the image pickup apparatus 1C (also referred to as "recommended holding direction") is specified as the recommended composition. In addition, except for the point that the recommended holding direction of the image pickup apparatus 1C is specified as the recommended composition, the image pickup apparatus 1C has almost the same structure and functions (refer to FIGS. 1 to 4) as the image pickup apparatus 1A. Then, the same symbols are assigned to common components and description thereof will be omitted. FIG. 20 is a block diagram illustrating the functional structure of the image pickup apparatus 1C. FIGS. 21 to 24 are diagrams illustrating auxiliary images HGs including facial areas, respectively. FIG. 25 is a diagram illustrating an example of a display of a live view image.

As shown in FIG. 20, compared to the image pickup apparatus 1A, the image pickup apparatus 1C further includes an attitude sensor 91 and furthermore functionally realizes an attitude sensing unit 130 in the overall controller 101.

The attitude sensing unit 130 has a function of sensing the attitude of the image pickup apparatus 1C by determining whether the image pickup apparatus 1C is held in the longitudinal position thereof or in the lateral position thereof on the basis of an attitude sensing signal output from the attitude sensor 91. For example, a common sensor, such as a sensor including conducting medium which is movable according to the attitude of the image pickup apparatus 1C and utilizing the change of an electric current which varies in response to the movement of the conducting medium, may be adopted as the attitude sensor 91.

The recommended-composition specifying unit 125 specifies the recommended composition by determining the recommended holding direction of the image pickup apparatus 1C (also referred to as "recommended holding direction") on the basis of the attitude of the image pickup apparatus 1C and the existence position of the specific object.

More specifically, the recommended-composition specifying unit 125 determines whether the image pickup apparatus 1C is held in the longitudinal position thereof or in the lateral position thereof on the basis of the attitude of the image pickup apparatus 1C detected by the attitude sensing unit 130. Then, in the case that the auxiliary image is obtained when the image pickup apparatus 1C is held in the lateral position thereof, when the center position CP of the facial area in the auxiliary image is located at the upper portion in the auxiliary image, the recommended-composition specifying unit 125 specifies a composition, which is used for an image capturing by the image pickup apparatus 1C held in the longitudinal position thereof, as the recommended composition. Namely, in the case that the image pickup apparatus 1C is held in the lateral position thereof, when the center position CP of the facial area is located at the upper portion in the auxiliary image, a longitudinal holding direction (also simply referred to as "longitudinal direction") which realizes the attitude of the image pickup apparatus 1C held in the longitudinal position thereof is specified as the recommended holding direction of the image pickup apparatus 1C.

Figure 21:
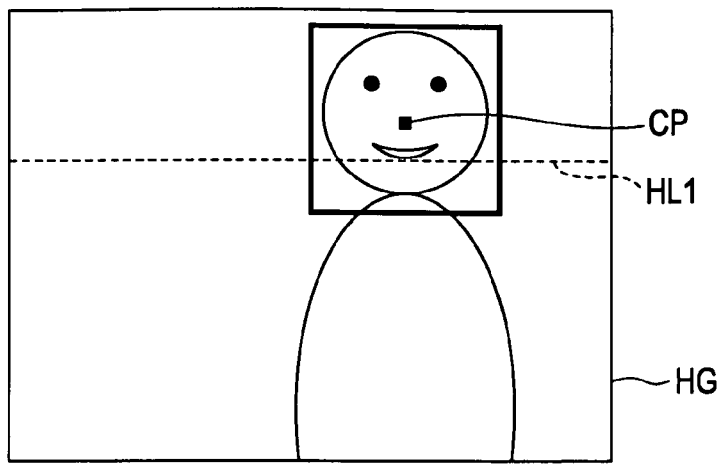
FIG. 21 is a diagram illustrating an auxiliary image including a facial area.
Figure 22:
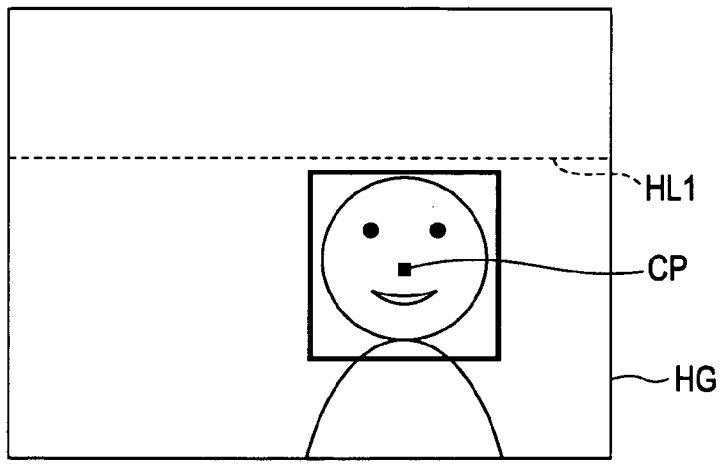
FIG. 22 is a diagram illustrating an auxiliary image including a facial area.

For example, as shown in FIG. 21, when the center position CP of the facial area in the auxiliary image HG is located at the upper portion in the auxiliary image HG, the recommended-composition specifying unit 125 determines that the recommended holding direction of the image pickup apparatus 1C is the longitudinal direction. In addition, as shown in FIG. 22, when the center position CP of the facial area in the auxiliary image HG is located at another portion other than the upper portion in the auxiliary image HG, the recommended-composition specifying unit 125 determines that the recommended holding direction of the image pickup apparatus 1C is a lateral direction. In addition, in FIGS. 21 and 22, the case that the top area among three equal areas into which the auxiliary image HG is divided vertically is selected as the upper portion in the auxiliary image HG is illustrated. Then, a dashed line HL1 which specifies the upper portion in the auxiliary image HG is shown in FIGS. 21 and 22.

On the other hand, in the case that the auxiliary image is obtained when the image pickup apparatus 1C is held in the longitudinal position thereof, when the center position CP of the facial area in the auxiliary image is located at the lower portion in the auxiliary image, the recommended-composition specifying unit 125 specifies a composition, which is used for an image capturing by the image pickup apparatus 1C held in the lateral position thereof, as the recommended composition. Namely, in the case that the image pickup apparatus 1C is held in the longitudinal position thereof, when the center position CP of the facial area is located at the lower portion in the auxiliary image, a lateral holding direction (also simply referred to as "lateral direction") which realizes the attitude of the image pickup apparatus 1C held in the lateral position thereof is specified as the recommended holding direction of the image pickup apparatus 1C.

Figure 23:
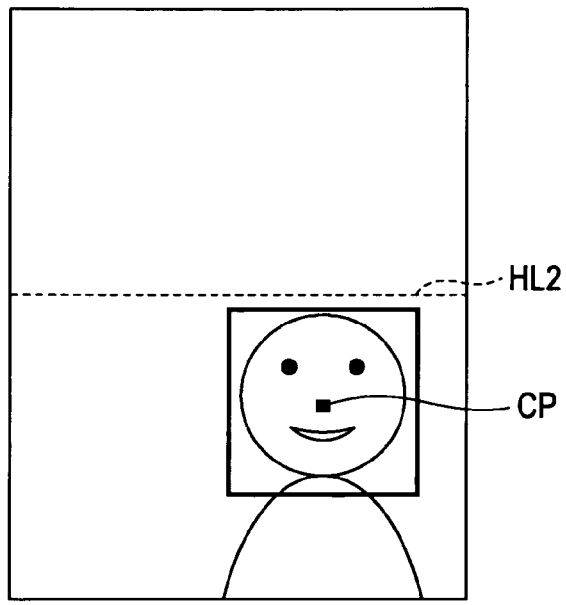
FIG. 23 is a diagram illustrating an auxiliary image including a facial area.

For example, as shown in FIG. 23, when the center position CP of the facial area in the auxiliary image HG is located at the lower portion in the auxiliary image HG, the recommended-composition specifying unit 125 determines that the recommended holding direction of the image pickup apparatus 1C is the lateral direction. In addition, as shown in FIG. 24, when the center position CP of the facial area in the auxiliary image HG is located at another portion other than the lower portion in the auxiliary image HG, the recommended-composition specifying unit 125 determines that the recommended holding direction of the image pickup apparatus 1C is the longitudinal direction. In addition, in FIGS. 23 and 24, the case that the lower area among two equal areas into which the auxiliary image is divided vertically is selected as the lower portion in the auxiliary image HG is illustrated. Then, a dashed line HL2 which specifies the lower portion in the auxiliary image HG is shown in FIGS. 21 and 22.

When the recommended-composition specifying unit 125 specifies the recommended holding direction, the instruction controller 126 instructs the display controller 127 to execute a display operation which notifies the user of the recommended holding direction.

When receiving the instruction of executing from the instruction controller 126, the display controller 127 causes the live view image, combined with a display indicating the recommended holding direction, to be displayed. For example, when the recommended holding direction is the longitudinal direction, the display controller 127 causes the monitor 12 to display the live view image combined with a display HV indicating the recommended holding direction, as shown in FIG. 25.

On the basis of the attitude of the image pickup apparatus 1C sensed by the attitude sensing unit 130 and the recommended holding direction, the composition determiner 129 determines whether or not a holding direction (also simply referred to as "current holding direction") which realizes the current attitude of the image pickup apparatus 1C conforms to (coincides with) the recommended holding direction of the image pickup apparatus 1C.

Figure 26:
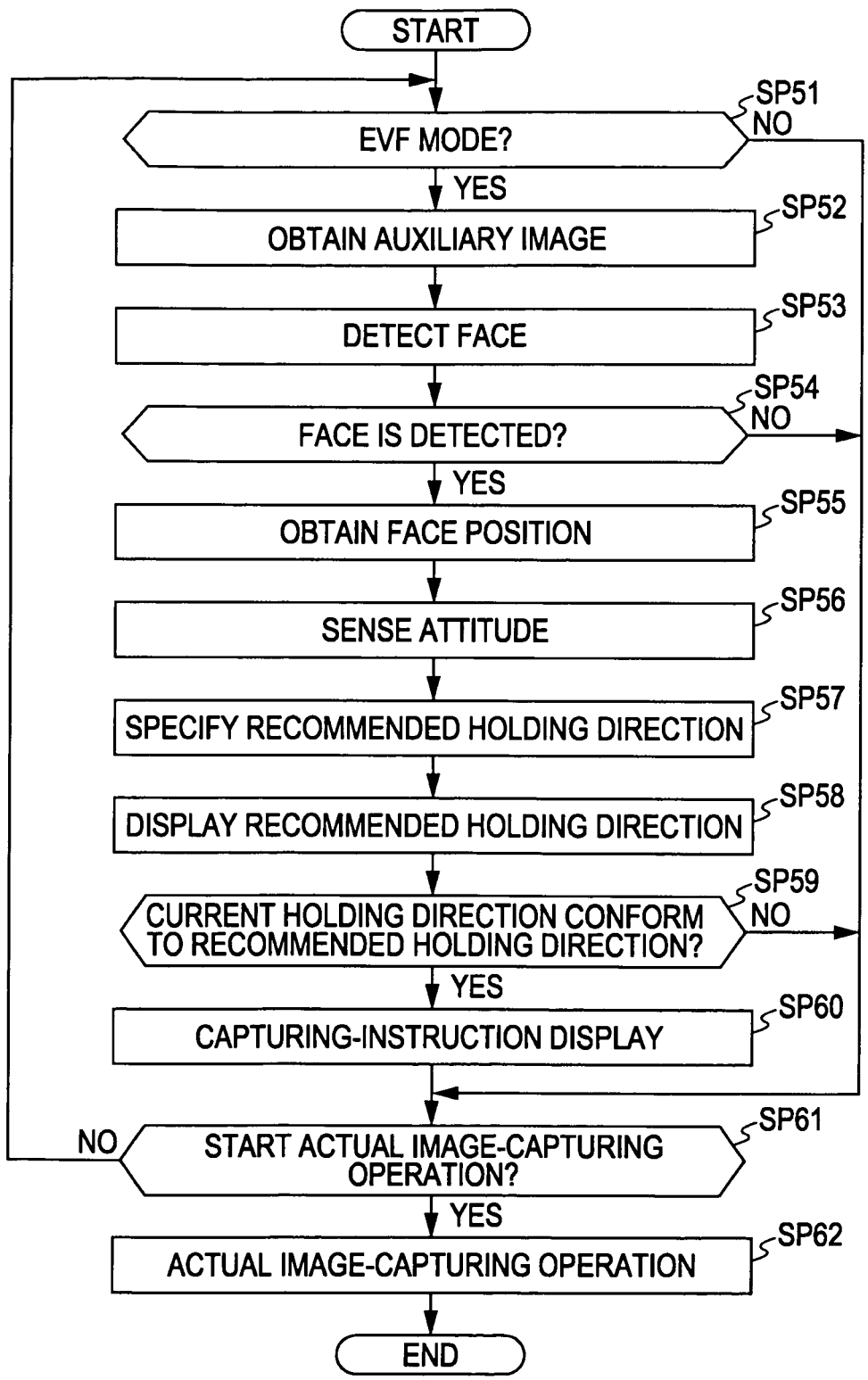
FIG. 26 is a flowchart illustrating an operation of an image pickup apparatus according to a third embodiment.

Here, an operation of the image pickup apparatus 1C will be described. FIG. 26 is a flowchart illustrating the operation of the image pickup apparatus 1C.

As shown in FIG. 26, in from Step SP51 through Step SP54 performed in the image pickup apparatus 1C, the same operations as those in from Step SP11 through Step SP14 performed in the image pickup apparatus 1A are performed respectively. Then, when the facial area is detected in the auxiliary image, in Step SP55 the existence position of the detected facial area is obtained.

In next Step SP56, the attitude sensing unit 130 senses a current attitude of the image pickup apparatus 1C (also referred to as "current attitude").

In Step SP57, the recommended-composition specifying unit 125 specifies the recommended holding direction on the basis of the existence position of the facial area and the current attitude of the image pickup apparatus 1C.

In Step SP58, in response to an instruction from the instruction controller 126, the display controller 127 causes the live view image LG, combined with a display HV indicating the recommended holding direction, to be displayed. Accordingly, the user can comprehend the recommended holding direction of the image pickup apparatus 1C by visually checking the monitor 12.

In Step SP59, the composition determiner 129 determines whether or not the current composition conforms to the recommended existence area, namely, the current holding direction of the image pickup apparatus 1C conforms to the recommended holding direction. When it is determined that the current holding direction of the image pickup apparatus 1C conforms to the recommended holding direction, the operation process shifts to Step SP60. In Step SP60, in response to an instruction from the instruction controller 126, the display controller 127 causes the monitor 12 to display the display HS prompting the user to perform an image-capturing operation (refer to FIG. 18).

On the other hand, when in Step SP59 it is determined that the current holding direction of the image pickup apparatus 1C does not conform to the recommended holding direction, the operation process shifts to Step SP61.

In Step SP61, by performing the same operation as that performed in Step SP21 in the image pickup apparatus 1A, whether or not an image-capturing operation for capturing an image to be stored is to be started is determined on the basis of a pressed down state of the release button 11. When the fully-pressed state of the release button 11 is not detected, the operation process shifts to Step SP51. Then, until the fully-pressed state of the release button 11 is detected, processes in from Step SP51 through Step SP61 are performed repeatedly. When the fully-pressed state of the release button 11 is detected, the process shifts to Step SP62 and thereby the image-capturing operation for capturing an image to be stored (actual image-capturing operation) is performed.

As described above, in the image pickup apparatus 1C, the recommended-composition specifying unit 125 specifies the recommended holding direction of the image pickup apparatus 1C. Then, the instruction controller 126 instructs the execution of the display operation which notifies the user of the recommended holding direction. Accordingly, the user can comprehend the recommended holding direction of the image pickup apparatus 1C before the actual image-capturing operation. Therefore, a captured image with a good composition can be obtained and the user's image-capturing skill can be improved. In addition, since the user can perform an image-capturing operation with the help of the recommended holding direction, the time necessary for determining a composition can be reduced.

4. Fourth Embodiment

Next, a fourth embodiment according to the present invention will be described. In an image pickup apparatus 1D according to the fourth embodiment, the display control of the display HV indicating the recommended holding direction is performed according to a determination result of whether or not the current composition conforms to the recommended composition, in more detail, whether or not the current holding direction of the image pickup apparatus 1D conforms to the recommended holding direction. In addition, except for the point that the display control of the display HV indicating the recommended holding direction is performed according to whether or not the current holding direction of the image pickup apparatus 1D conforms to the recommended holding direction, the image pickup apparatus 1D has almost the same structure and functions (refer to FIGS. 1 to 4 and 20) as the image pickup apparatus 1C. Therefore, the same symbols are assigned to common components and description thereof will be omitted.

As described above, in the image pickup apparatus 1D, the composition determiner 129 (refer to FIG. 20) determines whether or not the current composition conforms to the recommended composition, in detail, whether or not the current holding direction of the image pickup apparatus 1D conforms to the recommended holding direction.

Then, the instruction controller 126 in the image pickup apparatus 1D instructs the execution of a predetermined operation which notifies the user of the recommended composition (in this example, the recommended holding direction) according to a determination result of the composition determiner 129. More specifically, when it is determined that the current holding direction of the image pickup apparatus 1D does not conform to the recommended holding direction, the instruction controller 126 instructs the execution of the predetermined operation. Then, when it is determine that the current holding direction of the image pickup apparatus 1D conforms to the recommended holding direction, the instruction controller 126 does not instruct the execution of the predetermined operation.

Figure 27:
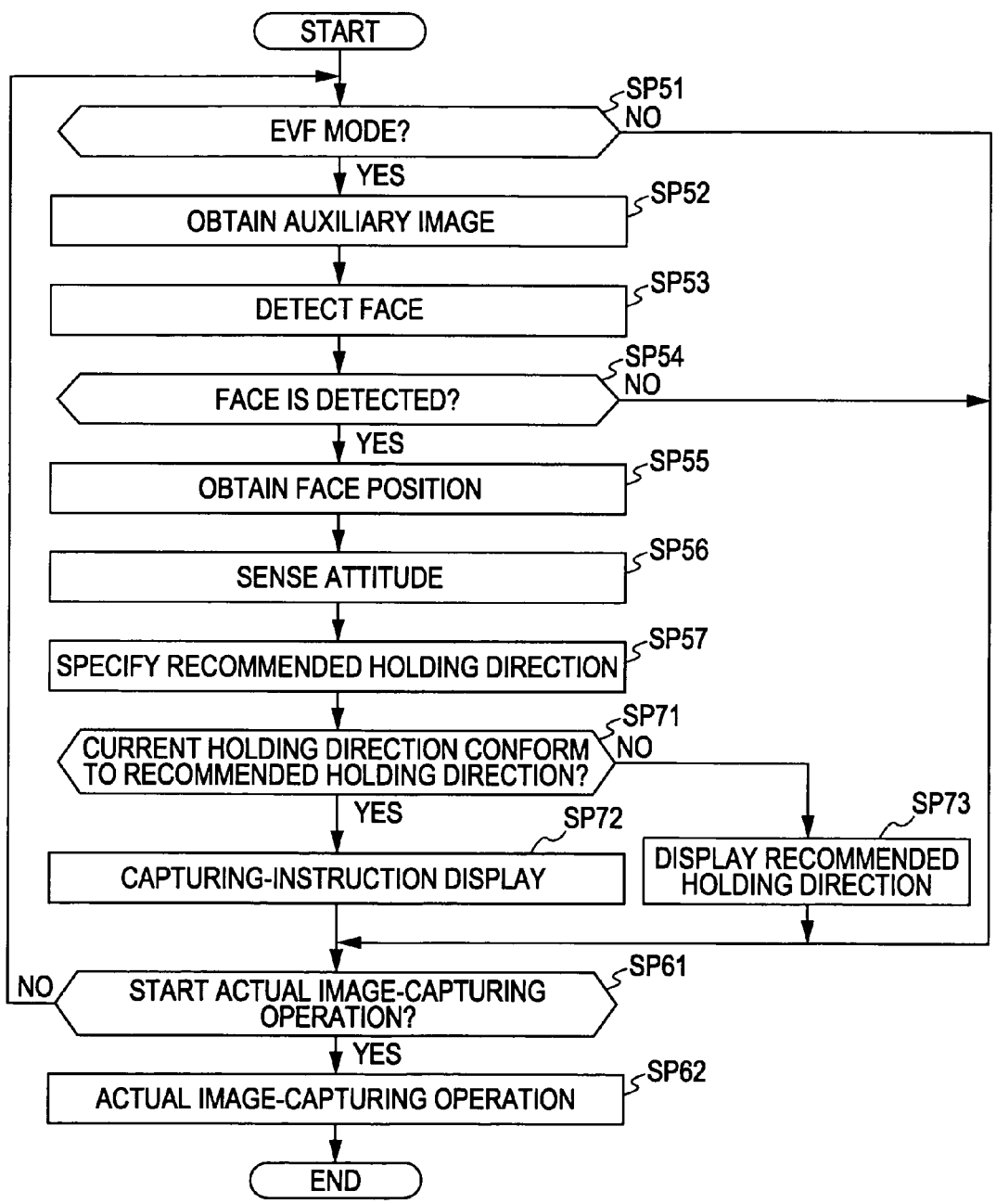
FIG. 27 is a flowchart illustrating an operation of an image pickup apparatus according to a fourth embodiment.

Here, an operation of the image pickup apparatus 1D will be described. FIG. 27 is a flowchart illustrating the operation of the image pickup apparatus 1D.

As shown in FIG. 27, in the image pickup apparatus 1D, the same operation as in the image pickup apparatus 1C are executed in from Step SP51 through Step SP57 respectively. Simply stated, after a person's face is detected in the auxiliary image to be the live view image, the existence position of the detected face is obtained. Then, after the current attitude of the image pickup apparatus 1D is sensed in Step SP56, the recommended holding direction of the image pickup apparatus 1D is specified on the basis of the existence position of the face and the current attitude of the image pickup apparatus 1D (Step SP57).

In next Step SP71, the composition determiner 129 determines whether or not the current holding direction of the image pickup apparatus 1D conforms to the recommended holding direction. When it is determined that the current composition does not conform to the recommended existence area, in detail, the current holding direction of the image pickup apparatus 1D does not conform to the recommended holding direction, the operation process shifts to Step SP73.

In Step SP73, in response to an instruction from the instruction controller 126, the display controller 127 causes the live view image LG, combined with the display HV indicating the recommended holding direction, to be displayed (refer to FIG. 25). Accordingly, the user can comprehend the recommended holding direction of the image pickup apparatus 1D by visually checking the monitor 12.

On the other hand, when in Step SP71 it is determined that the current composition conforms to the recommended composition, in detail, the current holding direction of the image pickup apparatus 1D conforms to the recommended holding direction, the operation process shifts to Step SP72 with executing no display operation of the display HV indicating the recommended holding direction. In Step SP72, in response to an instruction from the instruction controller 126, the display controller 127 causes the display HS prompting the user to perform an image-capturing operation to be displayed.

In Step SP61, whether or not an image-capturing operation for capturing an image to be stored is to be started is determined on the basis of a pressed down state of the release button 11. When the fully-pressed state of the release button 11 is not detected, the operation process shifts to Step SP51. Then, until the fully-pressed state of the release button 11 is detected, processes in from Step SP51 through Step SP57, in from Step SP71 through Step SP73, and in Step SP61 are performed repeatedly.

On the other hand, when the fully-pressed state of the release button 11 is detected, the process shifts to Step SP62 and thereby the image-capturing operation for capturing an image to be stored (actual image-capturing operation) is performed.

As described above, when the composition determiner 129 determines that the current holding direction of the image pickup apparatus 1D does not conform to the recommended holding direction, the instruction controller 126 in the image pickup apparatus 1D instructs the execution of the display operation of the display HV indicating the recommended holding direction. On the other hand, when the composition determiner 129 determines that the current holding direction of the image pickup apparatus 1D conforms to the recommended holding direction, the instruction controller 126 in the image pickup apparatus 1D does not instruct the execution of the display operation of the display HV indicating the recommended holding direction. Accordingly, when the current holding direction of the image pickup apparatus 1D conforms to the recommended holding direction, the display HV indicating the recommended holding direction can be prevented from being annoyingly displayed on the monitor 12, and thereby the visibility of the monitor 12 can be improved.

5. Fifth Embodiment

Figure 28:
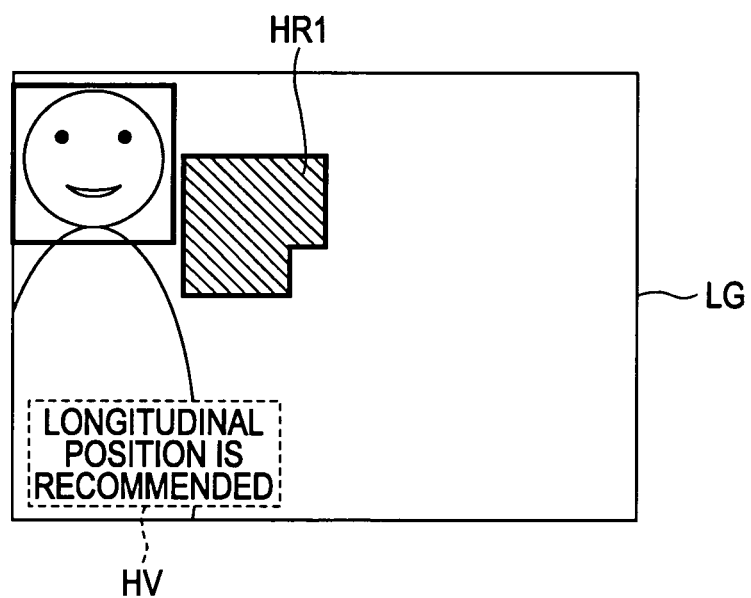
FIG. 28 is a diagram illustrating an example of a display of a live view image.

Next, a fifth embodiment according to the present invention will be described. In an image pickup apparatus 1E according to the fifth embodiment, operations in which the operations in the image pickup apparatus 1A according to the first embodiment and the image pickup apparatus 1C according to the third embodiment are combined are performed. Namely, in the image pickup apparatus 1E, the recommended existence area and the recommended holding direction are specified as the recommended composition. In addition, the image pickup apparatus 1E has almost the same structure and functions (refer to FIGS. 1 to 4) as the image pickup apparatus 1A and has functions in which the functions of the image pickup apparatus 1A and the image pickup apparatus 1C are combined. Therefore, the same symbols are assigned to common components and description thereof will be omitted. FIG. 28 is a diagram illustrating an example of a display of a live view image.

In the recommended-composition specifying unit 125 (refer to FIG. 20) in the image pickup apparatus 1E, the recommended existence area which is recommended as a layout of the detected face is specified on the basis of the face orientation and the existence position of the detected face. In addition, the recommended holding direction of the image pickup apparatus 1E is specified on the basis of the attitude of the image pickup apparatus 1E and the existence position of the face.

When the recommended-composition specifying unit 125 specifies the recommended existence area and the recommended holding direction, the instruction controller 126 instructs the execution of a predetermined operation which notifies the user of the recommended existence area and the recommended holding direction.

When receiving the instruction of executing from the instruction controller 126, the display controller 127 causes the live view image, combined with the display HR1 indicating the recommended existence area and the display HV indicating the recommended holding direction, to be displayed.

For example, when the recommended candidate area KR1 is selected as the recommended existence area GR and the recommended holding direction is determined as the longitudinal direction, the display controller 127 causes the monitor 12 display the live view image LG, combined with the display HR1 indicating the recommended existence area GR and the display HV indicating the recommended holding direction, as shown in FIG. 28.

By determining whether or not the detected face exists in the recommended existence area and whether or not the current holding direction conforms to the recommended holding direction, respectively, the composition determiner 129 determines whether or not the current composition conforms to the recommended composition.

Figure 29:
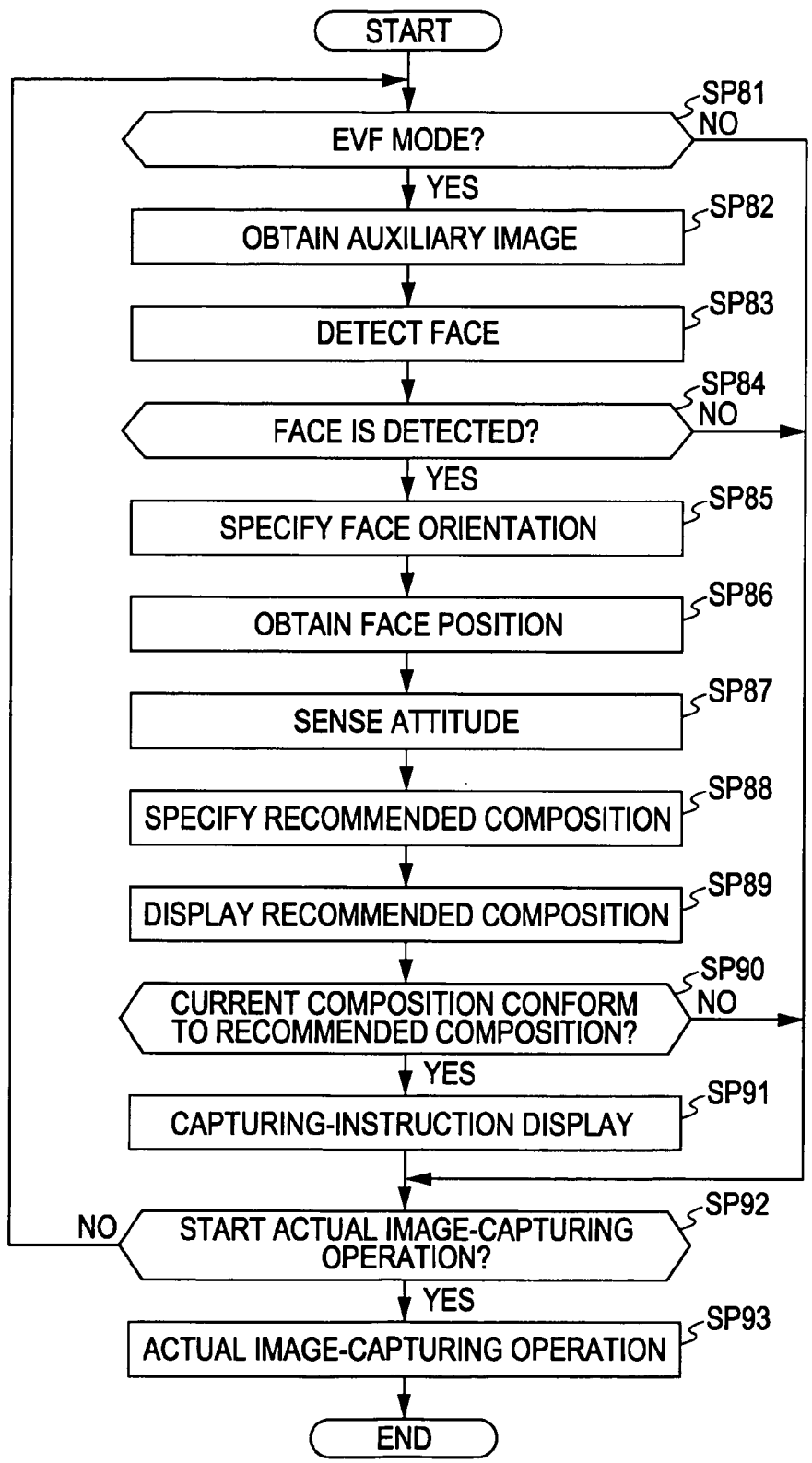
FIG. 29 is a flowchart illustrating an operation of an image pickup apparatus according to a fifth embodiment.

Here, an operation of the image pickup apparatus 1E will be described. FIG. 29 is a flowchart illustrating the operation of the image pickup apparatus 1E.

As shown in FIG. 29, in from Step SP81 to Step SP86 performed in the image pickup apparatus 1E, the same operations as those in from Step SP11 to Step SP16 (refer to FIG. 14) performed in the image pickup apparatus 1A are performed respectively. Simply stated, after a person's face is detected in the auxiliary image to be the live view image, the face orientation and the existence position of the detected face are obtained.

In next Step SP87, the same operation as that in Step SP56 (refer to FIG. 26) is performed, and the current attitude of the image pickup apparatus 1E is sensed.

In Step SP88, the recommended-composition specifying unit 125 specifies the recommended composition. More specifically, the recommended existence area and the recommended holding direction are specified respectively.

In Step SP89, in response to an instruction from the instruction controller 126, the display controller 127 executes a display operation of a display indicating the recommended composition. More specifically, the display controller 127 causes the live view image LG, combined with the display HR1 indicating the recommended existence area GR and the display HV indicating the recommended holding direction, to be displayed (refer to FIG. 28). Accordingly, by visually checking the monitor 12, the user can comprehend a recommended layout of the face and the recommended holding direction of the image pickup apparatus 1E.

In Step SP90, the composition determiner 129 determines whether or not the current composition conforms to the recommended composition. More specifically, whether or not the detected face exists in the recommended existence area and whether or not the current holding direction conforms to the recommended holding direction are determined, respectively. Then, when it is determined that the detected face exists in the recommended existence area and the current holding direction conforms to the recommended holding direction, it is determined that the current composition conforms to the recommended composition. Then, the operation process shifts to Step SP91. In Step SP91, in response to an instruction from the instruction controller 126, the display controller 127 causes the display HS prompting the user to perform an image-capturing operation to be displayed.

On the other hand, when it is determined that the detected face does not exist in the recommended existence area or it is determined that the current holding direction does not conform to the recommended holding direction, it is determined that the current composition does not conform to the recommended composition. Then, the operation process shifts to Step SP92.

In next Step SP92, whether or not an image-capturing operation for capturing an image to be stored is to be started is determined on the basis of a pressed down state of the release button 11. When the fully-pressed state of the release button 11 is not detected, the operation process shifts to Step SP81. Then, until the fully-pressed state of the release button 11 is detected, processes in from Step SP81 through Step SP92 are performed repeatedly.

In addition, when in Step SP92 the fully-pressed state of the release button 11 is detected, the process shifts to Step SP93 and thereby the image-capturing operation for capturing an image to be stored (actual image-capturing operation) is performed.

As described above, in the image pickup apparatus 1E, the recommended-composition specifying unit 125 specifies the recommended existence area and the recommended holding direction of the image pickup apparatus 1E. Then, the instruction controller 126 instructs the execution of the display operation which notifies the user of the recommended existence area and the recommended holding direction. Accordingly, the user can comprehend the recommended existence area and the recommended holding direction of the image pickup apparatus 1E before the actual image-capturing operation. Therefore, a captured image with a good composition can be obtained and the user's image-capturing skill can be improved.

6. Sixth Embodiment

Next, a sixth embodiment according to the present invention will be described. In an image pickup apparatus 1F according to the sixth embodiment, operations in which the operations in the image pickup apparatus 113 according to the second embodiment and the image pickup apparatus 1D according to the fourth embodiment are combined are performed. Namely, in the image pickup apparatus 1F, a display control of a display indicating the recommended composition is executed according to whether or not the current composition conforms to the recommended composition. In addition, except for the point that the display control of the display indicating the recommended composition is executed according to whether or not the current composition conforms to the recommended composition, the image pickup apparatus 1F has almost the same structure and functions (refer to FIGS. 1 to 4 and 20) as the image pickup apparatus 1E. Therefore, the same symbols are assigned to common components and description thereof will be omitted.

The determination of whether or not the current composition conforms to the recommended composition is performed by the composition determiner 129 (refer to FIG. 20). Then, the instruction controller 126 in the image pickup apparatus 1F instructs the execution of a predetermined operation which notifies the user of the recommended composition according to the determination result of the composition determiner 129.

Figure 30:
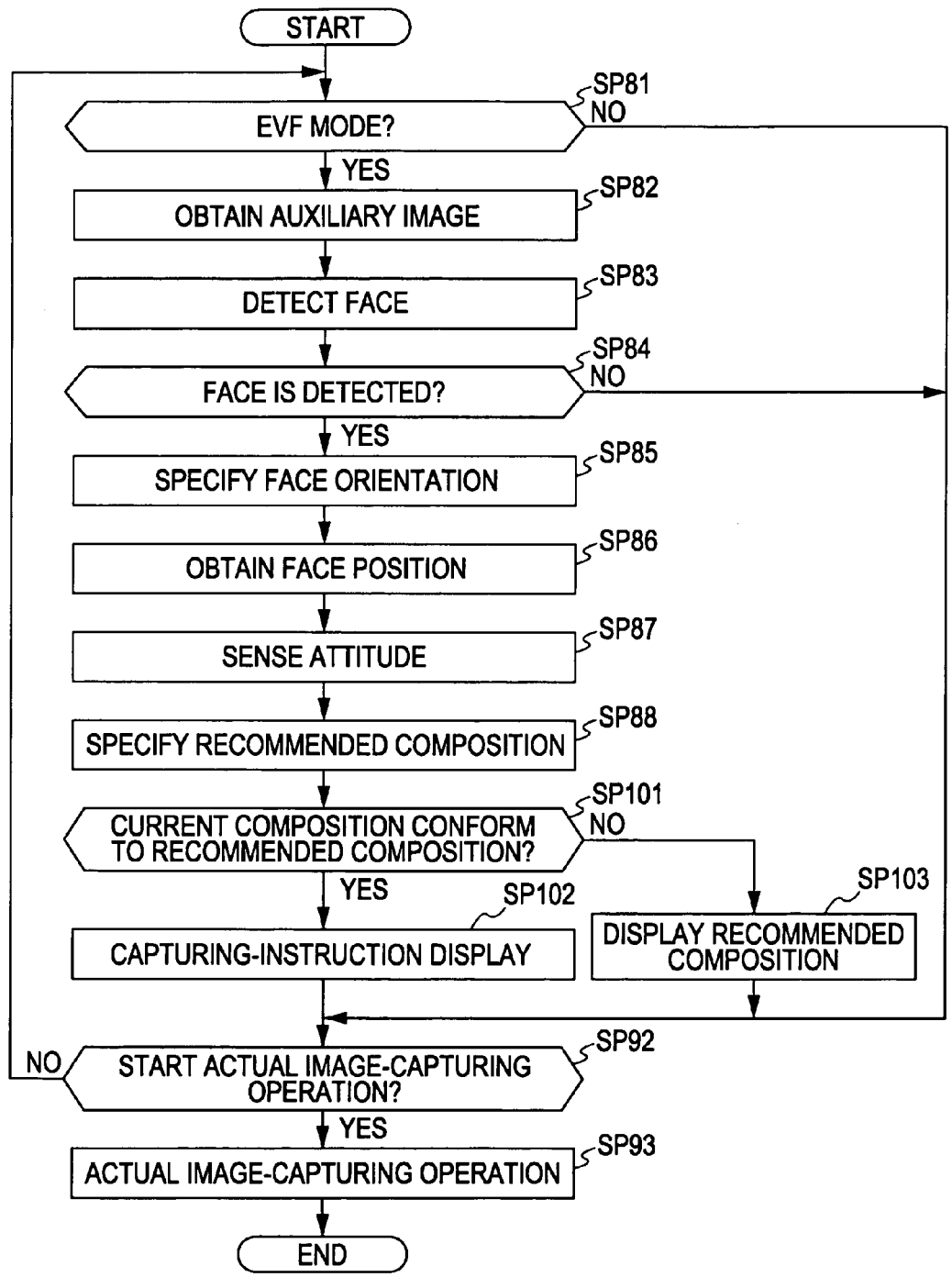
FIG. 30 is a flowchart illustrating an operation of an image pickup apparatus according to a sixth embodiment.

Here, an operation of the image pickup apparatus 1F will be described. FIG. 30 is a flowchart illustrating the operation of the image pickup apparatus 1F.

As shown in FIG. 30, in the image pickup apparatus 1F, the same operation as in the image pickup apparatus 1E are executed in from Step SP81 through Step SP88 respectively. Simply stated, after a person's face is detected in the auxiliary image to be the live view image, the face orientation and the existence position of the detected face are obtained and the current attitude of the image pickup apparatus 1F is sensed. Then, in Step SP88, the recommended-composition specifying unit 125 specifies the recommended composition, the recommended existence area, and the recommended holding direction, respectively.

In next Step SP101, the composition determiner 129 determines whether or not the current composition conforms to the recommended composition. As conformance determinations, a conformance determination regarding a layout of the face, namely, whether or not the detected face exists in the recommended existence area, and a conformance determination regarding a holding direction, namely, whether or not the current holding direction of the image pickup apparatus 1F conforms to the recommended holding direction, are performed, respectively.

Then, when in Step SP101 it is determined that the detected face does not exist in the recommended existence area and/or the current holding direction of the image pickup apparatus 1F does not conform to the recommended holding direction, it is determined that the current composition does not conform to the recommended composition. Then, the operation process shifts to Step SP103.

In Step SP103, in response to an instruction from the instruction controller 126, the display controller 127 causes the live view image, combined with the display indicating the recommended composition, to be displayed. More specifically, when in Step SP101 it is determined that the detected face does not exist in the recommended existence area GR, the display controller 127 causes the live view image LG, combined with the display HR1 indicating the recommended existence area GR, to be displayed (refer to FIG. 13). In addition, when in Step SP101 it is determined that the current holding direction does not conform to the recommended holding direction, the display controller 127 causes the live view image LG, combined with the display HV indicating the recommended holding direction, to be displayed (refer to FIG. 25). In addition, when in Step SP101 it is determined the detected face does not exist in the recommended existence area and the current holding direction of the image pickup apparatus 1F does not conform to the recommended holding direction, the display controller 127 causes the live view image LG, combined with the display HR1 indicating the recommended existence area and the display HV indicating the recommended holding direction, respectively, to be displayed (refer to FIG. 28).

Accordingly, by visually checking the monitor 12, the user can comprehend a recommended composition.

On the other hand, when in Step SP101 it is determined that the detected face exists in the recommended existence area and the current holding direction of the image pickup apparatus 1F conforms to the recommended holding direction, namely, it is determined that the current composition conforms to the recommended composition, the operation process shifts to Step SP102 with executing no display operation of the display indicating the recommended composition. In Step SP32, in response to an instruction from the instruction controller 126, the display controller 127 causes the monitor 12 display the display HS prompting the user to perform an image-capturing operation.

In Step SP92, whether or not an image-capturing operation for capturing an image to be stored (actual image-capturing operation) is to be started is determined on the basis of a pressed down state of the release button 11. When the fully-pressed state of the release button 11 is not detected, the operation process shifts to Step SP81. Then, until the fully-pressed state of the release button 11 is detected, processes in from Step SP81 through Step SP88, in from Step SP101 through Step SP103, and in Step SP92 are performed repeatedly.

On the other hand, when the fully-pressed state of the release button 11 is detected, the process shifts to Step SP93 and thereby the actual image-capturing operation is performed.

As described above, the instruction controller 126 in the image pickup apparatus 1F controls the execution of the display operation of the display HR1 indicating the recommended existence area and the display HV indicating the recommended holding direction according to the determination result of the composition determiner 129. Accordingly, when the facial area exists in the recommended existence area GR, the display HR1 indicating the recommended existence area GR can be prevented from being displayed on the monitor 12. In addition, when the current holding direction of the image pickup apparatus 1F conforms to the recommended holding direction, the display HV indicating the recommended holding direction can be prevented from being displayed on the monitor 12. Therefore, the visibility of the monitor 12 can be improved.

7. Modifications

While embodiments according to the present invention are described as above, the present invention is not limited to these embodiments.

Figure 31:
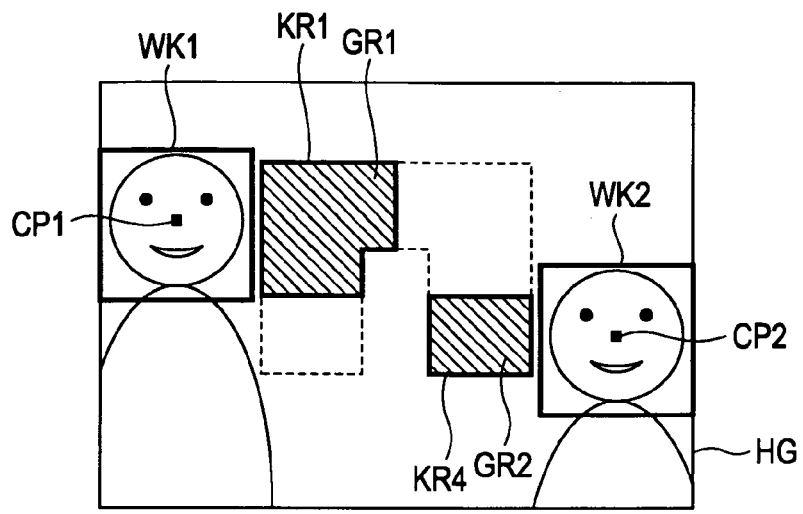
FIG. 31 is a diagram virtually illustrating a recommended candidate area on an auxiliary image.
Figure 32:
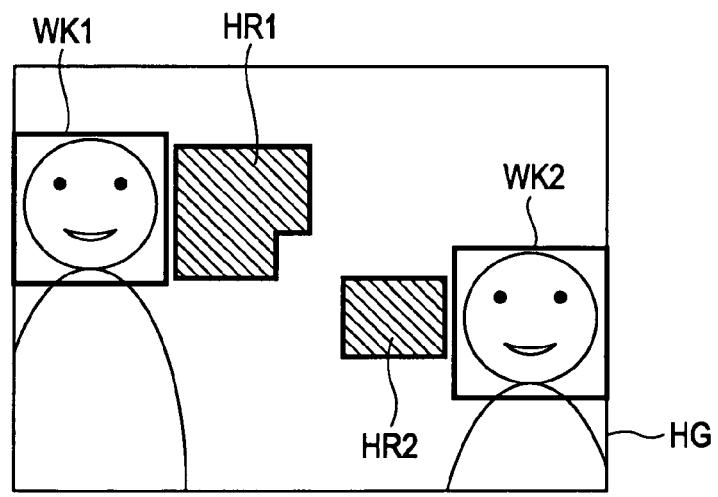
FIG. 32 is a diagram illustrating an example of a display of a live view image.

For example, in each of the above-mentioned embodiments, the specific object detector 123 may detect a plurality of faces in the auxiliary image. FIG. 31 is a diagram virtually illustrating recommended candidate areas on an auxiliary image. FIG. 32 is a diagram illustrating an example of a display of a live view image.

More specifically, as shown in FIG. 31, when the plurality of faces are detected, the recommended-composition specifying unit 125 respectively selects, as recommended existence areas GR1 and GR2, the recommended candidate areas KR1 and KR2 which are respectively located at the closest positions to the center positions CP1 and CP2 of the facial areas. Then, as shown in FIG. 32, the display controller 127 causes the live view image, combined with displays HR1 and HR2 indicating the recommended existence areas GR1 and GR2, respectively, to be displayed. In addition, when displayed, a face frame WK1 and the display HR1 indicating the recommended existence area GR1 may be displayed in blue and a face frame WK2 and a display HR2 indicating the recommended existence area GR2 may be displayed in red. In this way, a face frame WK and a recommended existence area GR related to the face frame WK may be displayed in the same color so as to correspond to each other.

In addition, in each of the above-mentioned embodiments, as the predetermined operation which notifies the user of the recommended composition specified by the recommended-composition specifying unit 125, the display operation on the monitor 12 is performed. However, the predetermined operation which notifies the user of the recommended composition is not limited to the example. More specifically, the user may be notified of the recommended composition by using an audio signal.

In addition, as described above, in the first embodiment, the second embodiment, the fifth embodiment, and the sixth embodiment, when it is determined that the detected face exists in the recommended existence area GR, the display color of the face frame WK and/or the recommended existence area GR may be changed.

In addition, in the image pickup apparatus 1A according to the above-mentioned first embodiment, when the fully-pressed state of the release button 11 is detected, the image-capturing operation for capturing an image to be stored (actual image-capturing operation) is executed. However, the execution of the actual image-capturing operation is not limited to the example. More specifically, when it is determined that the face detected by the composition determiner 129 exists in the recommended existence area GR, the actual image-capturing operation may be started automatically.

Figure 33:
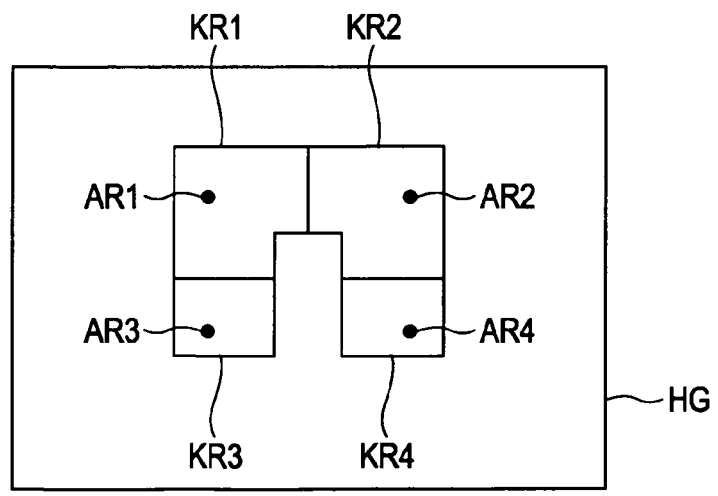
FIG. 33 is a diagram virtually illustrating distance measurement areas on the auxiliary image.

In addition, as described above, in the first embodiment, the second embodiment, the fifth embodiment, and the sixth embodiment, the recommended candidate areas KR1 to KR4 may be set in the light of the existence position of distance measurement areas AR1 to AR4 in the image capturing area. FIG. 33 is a diagram virtually illustrating the distance measurement areas AR1 to AR4 on the auxiliary image HG.

More specifically, as shown in FIG. 33, the recommended candidate areas KR1 to KR4 may be set so as to include the distance measurement areas AR1 to AR4 in the image capturing area. Accordingly, when the facial area is moved into the recommended existence area GR through the user's framing, the facial area can include the distance measurement area. Therefore, an AF operation can be performed so as to focus on the facial area as a focused object.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
    an image pickup device configured to obtain a captured image corresponding to an object image;
    object detecting means for detecting a specific object in the captured image;
    position obtaining means for obtaining a position at which the specific object exists in the captured image;
    composition specifying means for specifying, on the basis of the existence position of the specific object, a recommended composition which is recommended when the specific object is viewed as a main object, wherein the composition specifying means specifies the recommended composition by selecting one of a plurality of recommended candidate areas, each recommended candidate area corresponding to a different area in which the main object is intended to exist, wherein the recommended candidate area selected by the composition specifying means corresponds to the area located closest to the specific object; and
    instruction control means for instructing the execution of a predetermined operation which notifies a user of the recommended composition.

2. The image pickup apparatus according to claim 1, further comprising:
    attitude sensing means for sensing the attitude of the image pickup apparatus,
    wherein the composition specifying means specifies a recommended holding direction of the image pickup apparatus on the basis of the attitude of the image pickup apparatus and the existence position of the specific object; and
    the instruction control means instructs the execution of the predetermined operation which notifies the user of the recommended holding direction.

3. The image pickup apparatus according to claim 2, further comprising:
    display control means for causing a display unit to display a live view image on the basis of the captured image successively obtained by the image pickup device,
    wherein the display control means causes the live view image, combined with a display indicating the recommended holding direction, to be displayed when receiving the instruction of executing the predetermined operation from the instruction control means.

4. The image pickup apparatus according to claim 2, wherein
    the composition specifying means specifies a recommended existence area of the specific object in the captured image on the basis of the existence position of the specific object; and
    the instruction control means instructs the execution of the predetermined operation which notifies the user of the recommended existence area.

5. The image pickup apparatus according to claim 1, further comprising:
    composition determining means for determining, on the basis of the existence position of the specific object, whether or not a current composition conforms to the recommended composition,
    wherein the instruction control means instructs the execution of the predetermined operation when the composition determining means determines that the current composition does not conform to the recommended composition; and
    the instruction control means does not instruct the execution of the predetermined operation when the composition determining means determines that the current composition conforms to the recommended composition.

6. The image pickup apparatus according to claim 5, further comprising:
    attitude sensing means for sensing the attitude of the image pickup apparatus,
    wherein the composition specifying means specifies a recommended holding direction of the image pickup apparatus on the basis of the attitude of the image pickup apparatus and the existence position of the specific object;
    the composition determining means determines whether or not a current holding direction conforms to the recommended holding direction, the current holding direction realizing the attitude of the image pickup apparatus; and
    the instruction control means instructs the execution of the predetermined operation, which notifies the user of the recommended holding direction, when the composition determining means determines that the current holding direction does not conform to the recommended holding direction; and
    the instruction control means does not instruct the execution of the predetermined operation, which notifies the user of the recommended holding direction, when the composition determining means determines that the current holding direction conforms to the recommended holding direction.

7. The image pickup apparatus according to claim 1, wherein
    the composition specifying means specifies a recommended existence area of the specific object in the captured image on the basis of the existence position of the specific object; and
    the instruction control means instructs the execution of the predetermined operation which notifies the user of the recommended existence area.

8. The image pickup apparatus according to claim 7, further comprising:
    display control means for causing a display unit to display a live view image on the basis of the captured image successively obtained by the image pickup device,
    wherein the display control means causes the live view image, combined with a display indicating the recommended holding direction, to be displayed when receiving the instruction of executing the predetermined operation from the instruction control means.

9. The image pickup apparatus according to claim 5, wherein
- the composition specifying means specifies a recommended existence area of the specific object in the captured image on the basis of the existence position of the specific object;
- the composition determining means determines whether or not the specific object exists in the recommended existence area;
- the instruction control means instructs the execution of the predetermined operation, which notifies the user of the recommended existence area, when the composition determining means determines that the specific object does not exist in the recommended existence area; and
- the instruction control means does not instruct the execution of the predetermined operation, which notifies the user of the recommended existence area, when the composition determining means determines that the specific object exists in the recommended existence area.

10. The image pickup apparatus according to claim 1, wherein the specific object is a person's face.

11. A control method for an image pickup apparatus, the control method comprising the steps of:
- obtaining a captured image corresponding to an object image by using an image pickup device;
- detecting a specific object in the captured image;
- obtaining a position at which the specific object exists in the captured image;
- specifying, on the basis of the existence position of the specific object, a recommended composition which is recommended when the specific object is viewed as a main object, wherein the recommended composition is specified by selecting one of a plurality of recommended candidate areas, each recommended candidate area corresponding to a different area in which the main object is intended to exist, wherein the recommended candidate area that is selected corresponds to the area located closest to the specific object; and
- instructing the execution of a predetermined operation which notifies a user of the recommended composition.

12. A recording medium storing a computer readable program configured to cause a computer embedded in an image pickup apparatus to execute processing, the processing comprising the steps of:
- obtaining a captured image corresponding to an object image by using an image pickup device;
- detecting a specific object in the captured image;
- obtaining a position at which the specific object exists in the captured image;
- specifying, on the basis of the existence position of the specific object, a recommended composition which is recommended when the specific object is viewed as a main object, wherein the recommended composition is specified by selecting one of a plurality of recommended candidate areas, each recommended candidate area corresponding to a different area in which the main object is intended to exist, wherein the recommended candidate area that is selected corresponds to the area located closest to the specific object; and
- instructing the execution of a predetermined operation which notifies a user of the recommended composition.

13. An image pickup apparatus comprising:
- an image pickup device configured to obtain a captured image corresponding to an object image;
- an object detecting unit configured to detect a specific object in the captured image;
- a position obtaining unit configured to obtain a position at which the specific object exists in the captured image;
- a composition specifying unit configured to specify a recommended composition on the basis of the existence position of the specific object when the specific object is viewed as a main object, wherein the composition specifying unit specifies the recommended composition by selecting one of a plurality of recommended candidate areas, each recommended candidate area corresponding to a different area in which the main object is intended to exist, wherein the recommended candidate area selected by the composition specifying unit corresponds to the area located closest to the specific object; and
- an instruction control unit configured to instruct the execution of a predetermined operation which notifies a user of the recommended composition.

* * * * *